(12) United States Patent
Tatei

(10) Patent No.: US 12,535,342 B2
(45) Date of Patent: Jan. 27, 2026

(54) ABSOLUTE ENCODER, ANGLE ERROR CORRECTION DEVICE IN ABSOLUTE ENCODER, AND METHOD FOR CORRECTING ANGLE ERROR IN ABSOLUTE ENCODER

(71) Applicant: MINEBEA MITSUMI Inc., Nagano (JP)

(72) Inventor: Takanori Tatei, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 134 days.

(21) Appl. No.: 18/561,002

(22) PCT Filed: Mar. 25, 2022

(86) PCT No.: PCT/JP2022/014512
§ 371 (c)(1),
(2) Date: Nov. 15, 2023

(87) PCT Pub. No.: WO2022/244472
PCT Pub. Date: Nov. 24, 2022

(65) Prior Publication Data
US 2024/0280385 A1 Aug. 22, 2024

(30) Foreign Application Priority Data
May 21, 2021 (JP) .................. 2021-086357

(51) Int. Cl.
*G01D 5/244* (2006.01)
*G01D 18/00* (2006.01)

(52) U.S. Cl.
CPC ......... *G01D 5/2448* (2013.01); *G01D 18/001* (2021.05)

(58) Field of Classification Search
CPC ..................... G01D 5/2448; G01D 18/001
See application file for complete search history.

(56) References Cited

U.S. PATENT DOCUMENTS

| 5,121,116 A | * | 6/1992 | Taniguchi ......... G01D 5/24409 341/116 |
| 2005/0028614 A1 | * | 2/2005 | Saito .................... G01D 3/0365 73/862.333 |

(Continued)

FOREIGN PATENT DOCUMENTS

| CN | 107747931 A | * | 3/2018 | ............. G01B 21/22 |
| EP | 3 382 330 A1 | | 10/2018 | |

(Continued)

OTHER PUBLICATIONS

International Search Report for corresponding International Application No. PCT/JP2022/014512 mailed Apr. 26, 2022.

(Continued)

*Primary Examiner* — Chico A Foxx
(74) *Attorney, Agent, or Firm* — Chrisman Gallo Tochtrop LLC

(57) ABSTRACT

To suppress a maximum value of an angle deviation regardless of the position of a rotating body at the time of start-up. An absolute encoder includes a sensor configured to generate a signal indicating a value of a predetermined physical quantity varying depending on a rotation of a rotating body, a computer configured to generate angle information indicating an angle of the rotating body on the basis of the signal the computer determines an offset value for correcting an angle deviation indicating a difference between an angle indicated by the angle information and an actual angle of the rotating body to reduce the angle deviation, on the basis of the angle information at the time of start-up and a predetermined coefficient, and the computer corrects the angle deviation by using the offset value. The coefficient is calculated on the basis of the angle deviation.

4 Claims, 19 Drawing Sheets

(56) References Cited

U.S. PATENT DOCUMENTS

| | | |
|---|---|---|
| 2006/0290545 A1 | 12/2006 | Granig et al. |
| 2008/0148808 A1* | 6/2008 | Vasiloiu ............... G01D 5/2449 73/1.79 |
| 2008/0189934 A1* | 8/2008 | Henshaw ............. G01D 5/2449 29/428 |
| 2009/0315544 A1* | 12/2009 | Takahashi ............ G01D 5/2452 702/155 |
| 2010/0031097 A1* | 2/2010 | Seo .................... G01D 5/24495 714/709 |
| 2012/0146627 A1 | 6/2012 | Masson |
| 2012/0223699 A1* | 9/2012 | Holman, Jr. ........... G01D 5/145 324/207.2 |
| 2012/0242265 A1* | 9/2012 | Richter .................. H02P 6/182 318/400.11 |
| 2017/0030742 A1 | 2/2017 | Mochizuki et al. |
| 2017/0322014 A1* | 11/2017 | Jeon ..................... G01D 5/2454 |
| 2018/0252511 A1 | 9/2018 | Furukawa et al. |
| 2019/0390980 A1 | 12/2019 | Kakimi |
| 2020/0280245 A1* | 9/2020 | Osada .................... G01D 5/145 |
| 2020/0292360 A1 | 9/2020 | Kettering |
| 2021/0285802 A1* | 9/2021 | Loeken .................. G01D 18/00 |
| 2022/0364887 A1* | 11/2022 | Akama ................ G01D 5/2415 |

FOREIGN PATENT DOCUMENTS

| | | |
|---|---|---|
| EP | 3 584 541 A1 | 12/2019 |
| EP | 3 411 667 B1 | 11/2021 |
| JP | 2007-304000 A | 11/2007 |
| JP | 2010-148248 A | 7/2010 |
| JP | 2012533058 A | 12/2012 |
| JP | 2016-109436 A | 6/2016 |
| JP | 2017-032394 A | 2/2017 |
| JP | 2019-219296 A | 12/2019 |
| JP | 3228333 U | 10/2020 |
| WO | 2017/090153 A1 | 6/2017 |

OTHER PUBLICATIONS

Written Opinion for corresponding International Application No. PCT/JP2022/014512 dated Apr. 26, 2022 and English translation.
JP2021-086357 Final Office Action Apr. 10, 2025.

* cited by examiner

ABSOLUTE ENCODER, ANGLE ERROR CORRECTION DEVICE IN ABSOLUTE ENCODER, AND METHOD FOR CORRECTING ANGLE ERROR IN ABSOLUTE ENCODER

CROSS-REFERENCE TO RELATED APPLICATIONS

This application is a national stage entry of International Application No. PCT/JP2022/014512 filed on Mar. 25, 2022, which claims the benefit of priority to Japanese Application No. JP2021-086357, filed May 21, 2021, the entire disclosures of which are hereby incorporated herein by reference.

TECHNICAL FIELD

The present invention relates to an absolute encoder, an angle error correction device in the absolute encoder, and a method for correcting an angle error in the absolute encoder.

BACKGROUND ART

In the related art, a rotary encoder is known to be used to detect the position and angle of a rotating shaft such as a motor in various types of control machines. As a technique related to such a rotary encoder, for example, the following control device is known (for example, see PTL 1). The control device corrects an angle detection value from an encoder for detecting a rotation angle of a rotating body by using a correction amount corresponding to a detection error caused by the axis deviation. The control device compares the corrected angle detection value with a position command to calculate a position deviation, and controls a motor so that the position deviation approaches zero.

CITATION LIST

Patent Literature

PTL 1: JP 2010-148248 A

SUMMARY OF INVENTION

Technical Problem

The rotary encoder includes an incremental-type encoder detecting a relative angle and an absolute-type encoder (hereinafter, referred to as "absolute encoder") detecting an absolute position or angle. The absolute encoder uses a position (angle) of a rotating body at the time of start-up as a reference to detect the position of the rotating body by the amount of rotation from the reference.

However, the absolute encoder may include an error (hereinafter, referred to as "angle deviation") between a detected position (angle) of the rotating body and an actual position of the rotating body due to manufacturing variations and the like. In general, the absolute encoder uses a position of the rotating body at the time of start-up (hereinafter, referred to as "start position") as a reference, that is, as a zero point, to detect a subsequent position of the rotating body. At this time, the angle deviation at the zero point is regarded as 0° for detection. Therefore, in the absolute encoder in the related art, the reference of the angle deviation of the rotating body varies depending on the start position of the rotating body, resulting in a variation of an angle deviation having a maximum absolute value (hereinafter, referred to as "maximum angle deviation") among angle deviations in an entire angular range.

An object of some aspects of the present invention is to provide an absolute encoder suppressing a maximum value of an angle deviation regardless of a position of a rotating body at the time of start-up.

Solution to Problem

In order to achieve the above object, an absolute encoder according to the present invention includes a sensor configured to generate a signal indicating a value of a predetermined physical quantity varying depending on a rotation of a rotating body, a computer configured to generate angle information indicating an angle of the rotating body on the basis of the signal, the computer determines an offset value for correcting an angle deviation indicating a difference between an angle indicated by the angle information and an actual angle of the rotating body to reduce the angle deviation, on the basis of the angle information at the time of start-up and a predetermined coefficient, and the computer corrects the angle deviation by using the offset value. The coefficient is calculated on the basis of the angle deviation.

An absolute encoder according to the present invention can suppress a maximum value of an angle deviation regardless of a position of a rotating body at the time of start-up.

DESCRIPTION OF EMBODIMENTS

First Embodiment

Figure 1:
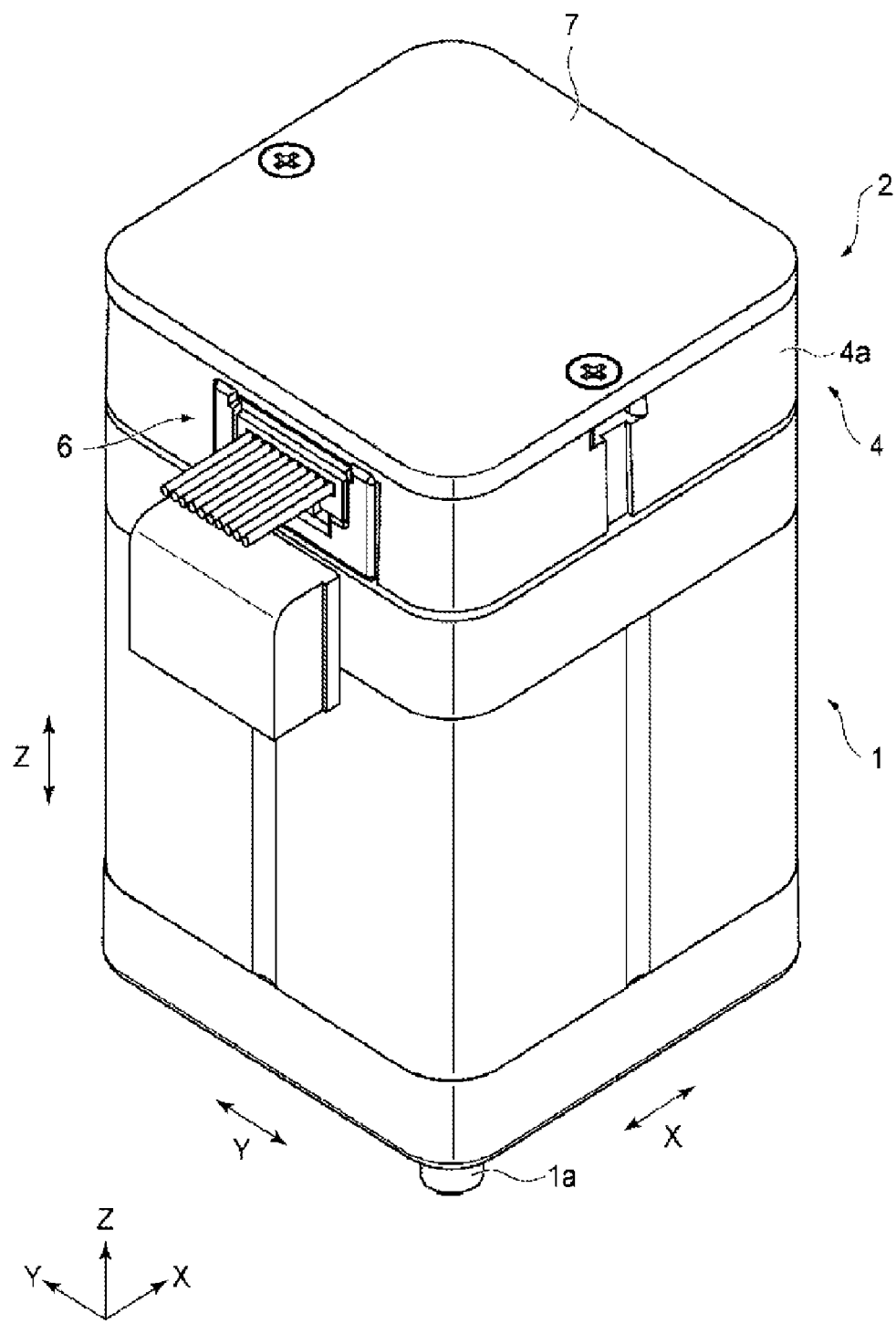
FIG. 1 is a perspective view schematically illustrating a configuration of an absolute encoder according to an embodiment of the present invention.

Hereinafter, an absolute encoder, an angle deviation correction device in the absolute encoder, and a method for correcting an angle deviation in the absolute encoder according to a first embodiment of the present invention are described with reference to the drawings.

Embodiments of the present invention are described below with reference to the drawings. In each of the embodiments and modified examples described below, the same or equivalent components and members are denoted by the same reference symbols, and redundant descriptions are omitted as appropriate. The dimensions of the members in each drawing are enlarged or reduced as appropriate to facilitate understanding. Furthermore, some members not critical in describing embodiments are omitted from the drawings. Also, in the drawings, gears are illustrated without a gear shape. Terms including ordinal numbers such as "first" and "second" are used to describe various components, but these terms are used only for distinguishing one component from other components and do not limit the components. Note that the present invention is not limited by the embodiments described below.

Figure 2:
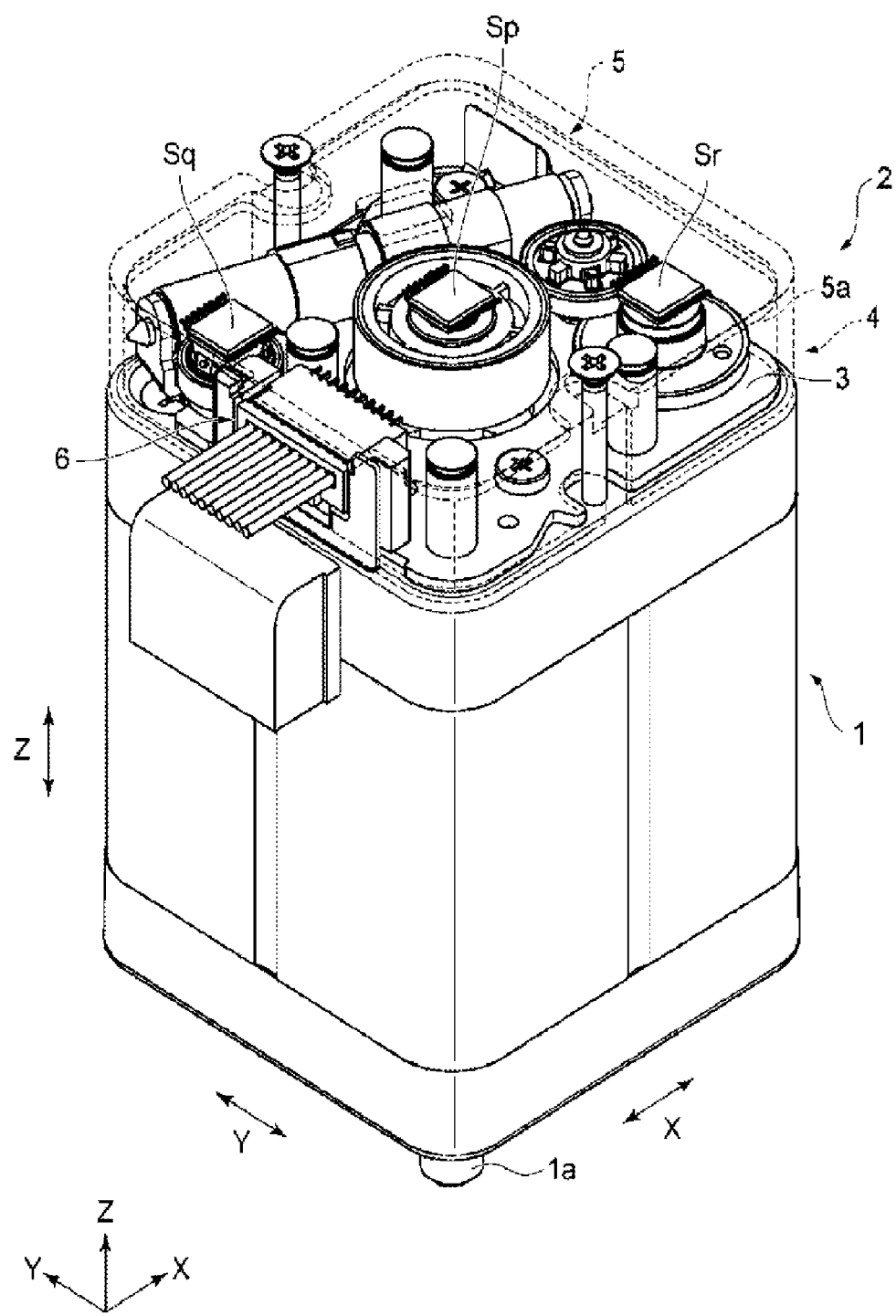
FIG. 2 is a perspective view schematically illustrating the configuration of the absolute encoder illustrated in FIG. 1 with a shield plate removed.
Figure 3:
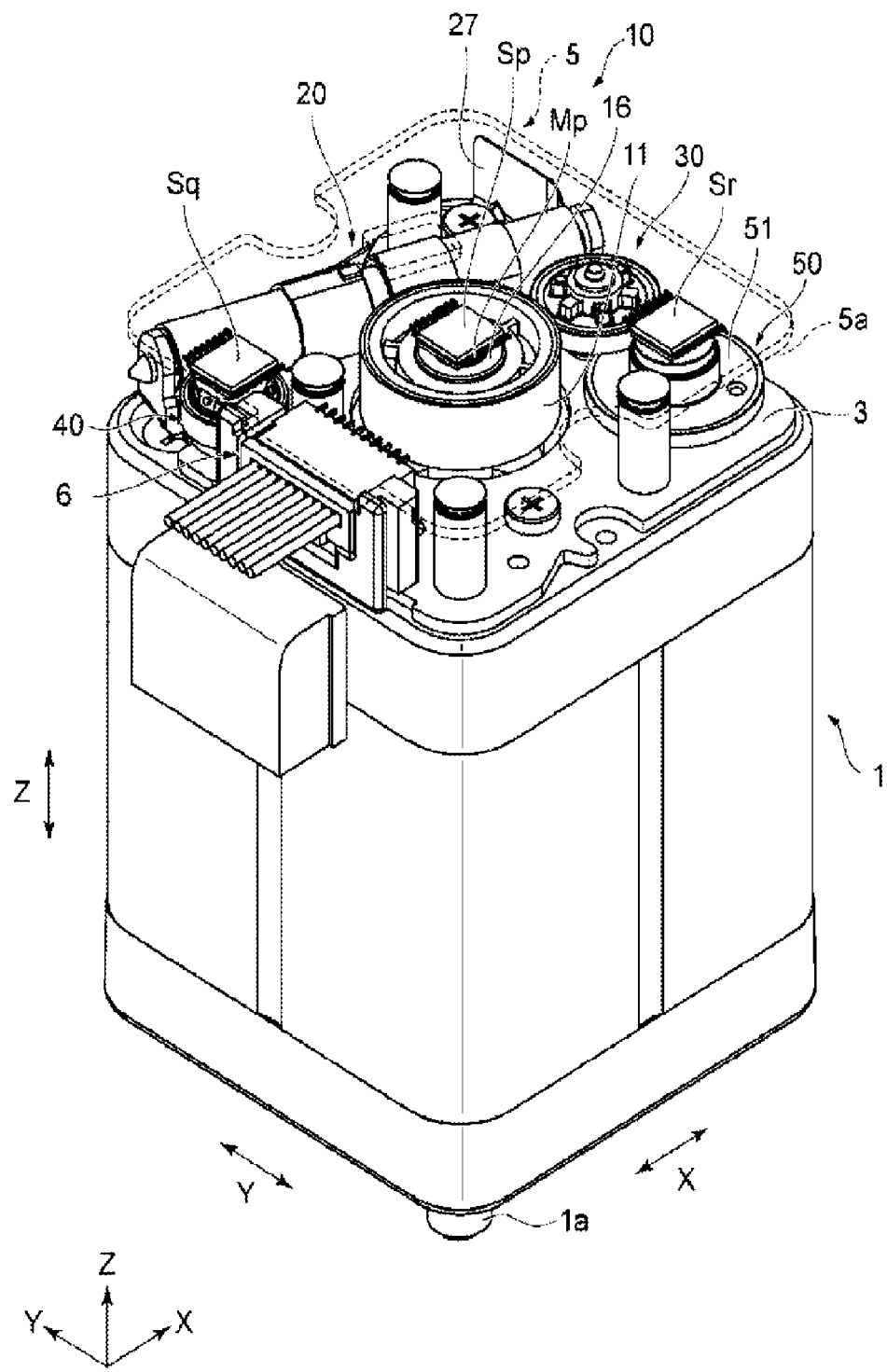
FIG. 3 is a perspective view schematically illustrating the configuration of the absolute encoder illustrated in FIG. 2 with a case removed.
Figure 4:
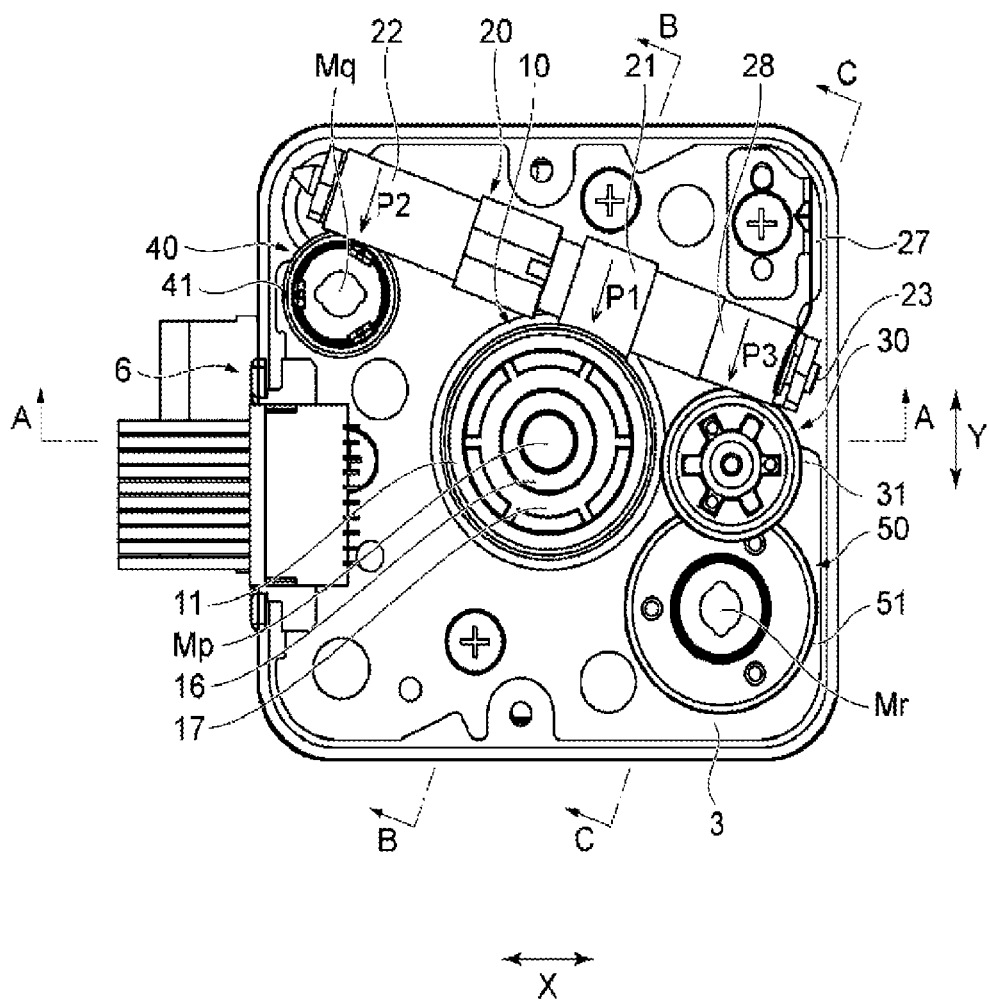
FIG. 4 is a plan view schematically illustrating the configuration of the absolute encoder illustrated in FIG. 3 with an angle sensor support substrate removed.

FIG. 1 is a perspective view schematically illustrating a configuration of an absolute encoder 2 according to a first embodiment of the present invention. FIG. 2 is a perspective view schematically illustrating the configuration of the absolute encoder 2 with a shield plate 7 removed. In FIG. 2, a case 4 and an angle sensor support substrate 5 of the absolute encoder 2 are transparently illustrated. FIG. 3 is a perspective view schematically illustrating the configuration of the absolute encoder 2 with the case 4 removed. In FIG. 3, the angle sensor support substrate 5 of the absolute encoder 2 is transparently illustrated. FIG. 4 is a plan view schematically illustrating the configuration of the absolute encoder 2 with the angle sensor support substrate 5 removed.

Figure 5:
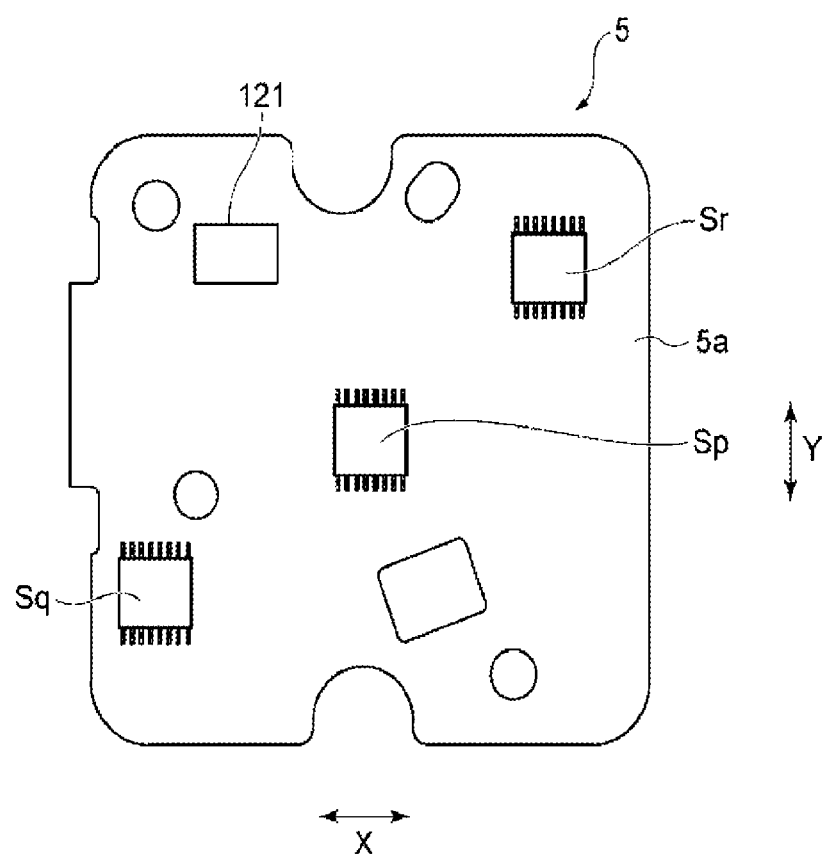
FIG. 5 is a view illustrating the angle sensor support substrate illustrated in FIG. 3 when viewed from a lower surface side.
Figure 6:
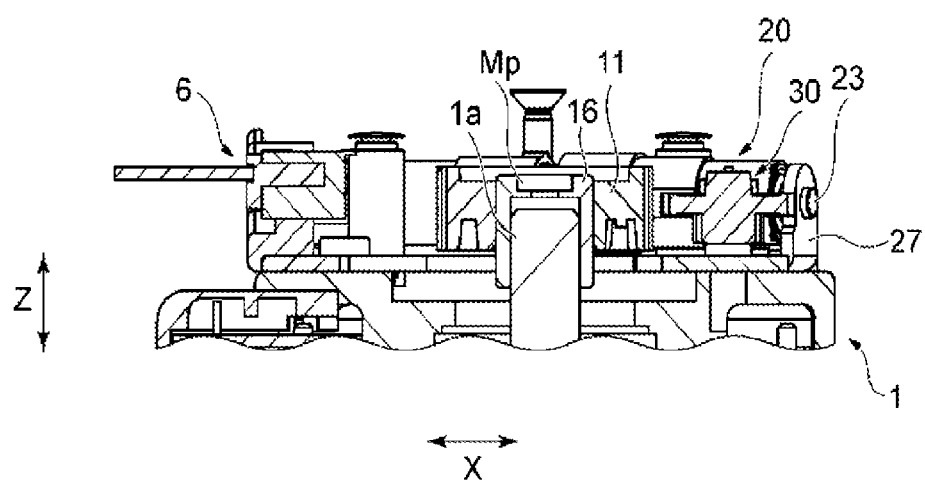
FIG. 6 is a cross-sectional view of the absolute encoder illustrated in FIG. 4 taken along line A-A.
Figure 7:
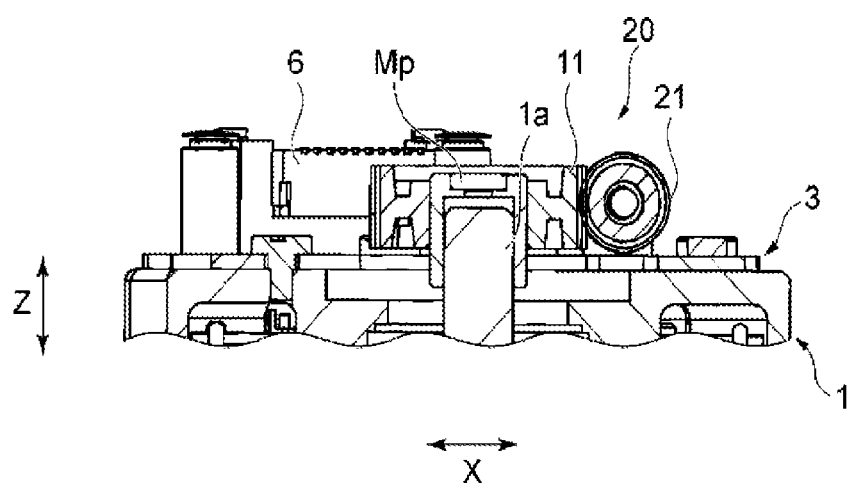
FIG. 7 is a cross-sectional view of the absolute encoder illustrated in FIG. 4 taken along line B-B.
Figure 8:
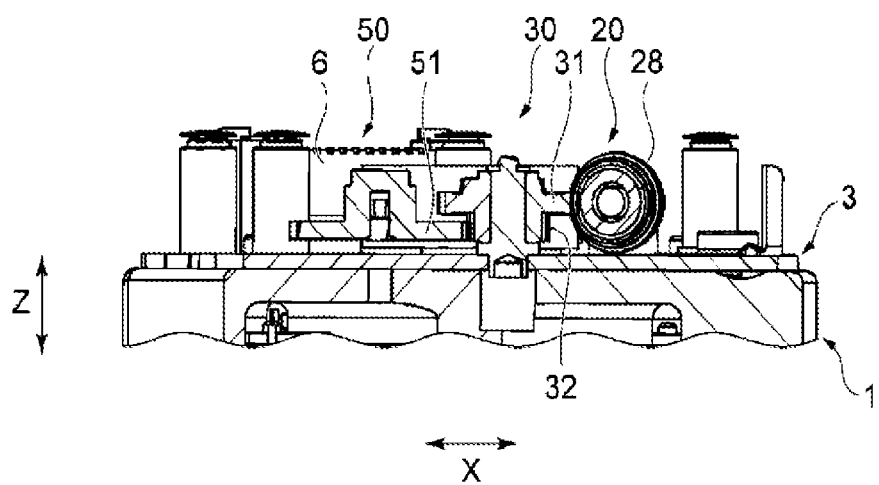
FIG. 8 is a cross-sectional view of the absolute encoder illustrated in FIG. 4 taken along line C-C.
Figure 9:
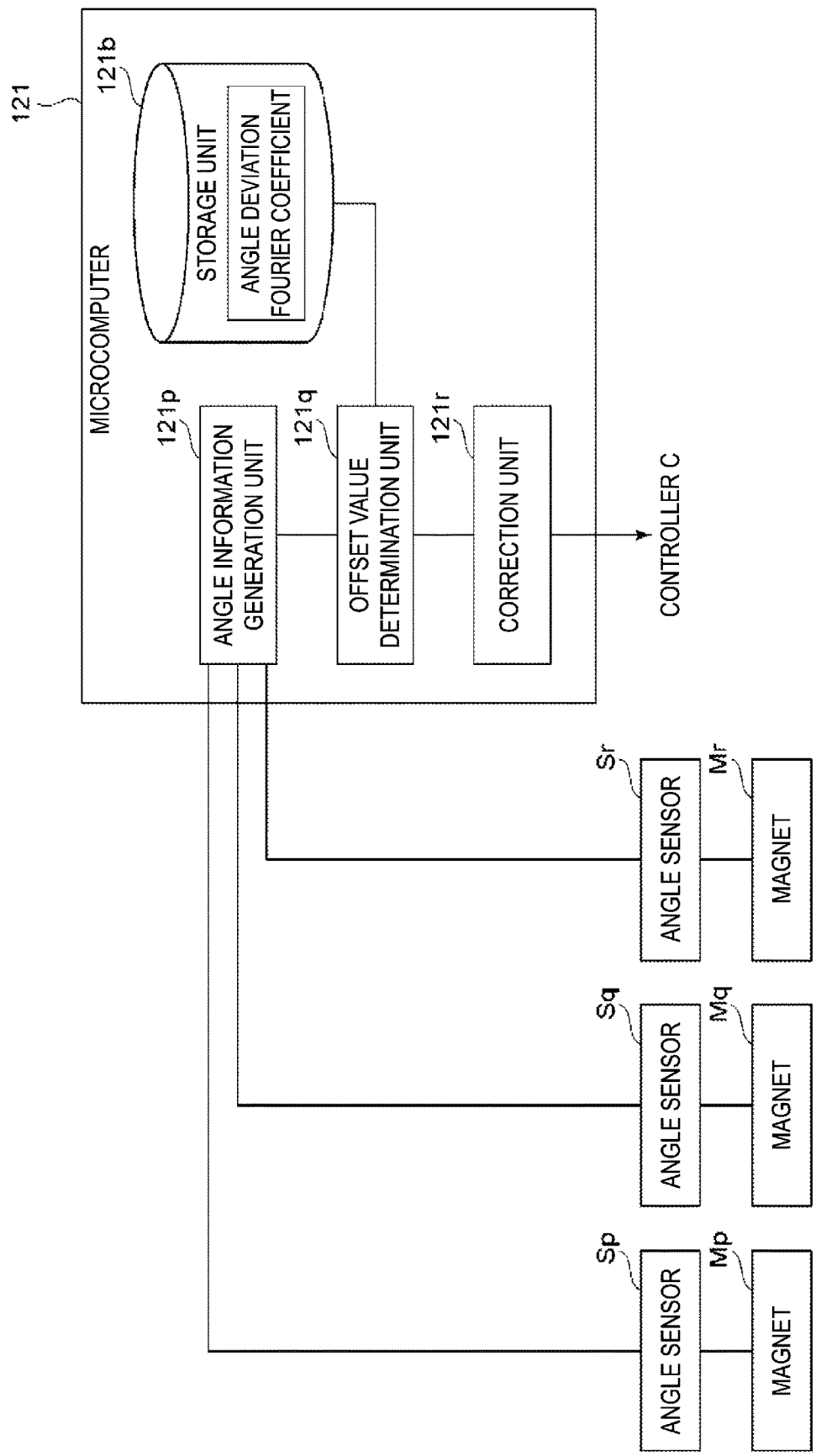
FIG. 9 is a block diagram schematically illustrating a functional configuration of a microcomputer included in the absolute encoder illustrated in FIG. 1.

FIG. 5 is a plan view of the angle sensor support substrate 5 when viewed from a lower side. FIG. 6 is a cross-sectional view of the absolute encoder 2 taken along line A-A. FIG. 7 is a cross-sectional view of the absolute encoder 2 taken along line B-B. FIG. 8 is a cross-sectional view of the absolute encoder 2 taken along line C-C. FIG. 9 is a block diagram schematically illustrating a functional configuration of a microcomputer 121 included in the absolute encoder 2. Hereinafter, the structure of the absolute encoder 2 is described in detail.

In the present embodiment, for convenience of explanation, the absolute encoder 2 is described with reference to an XYZ Cartesian coordinate system. The X-axis direction corresponds to a horizontal left-right direction, the Y-axis direction corresponds to a horizontal front-rear direction, and the Z-axis direction corresponds to a vertical up-down direction. The Y-axis direction and the Z-axis direction are orthogonal to the X-axis direction. In the present embodiment, the X-axis direction is also referred to as a left side or a right side, the Y-axis direction is also referred to as a front side or a rear side, and the Z-axis direction is also referred to as an upper side or a lower side. The absolute encoder 2 illustrated in FIGS. 1 and 2 is orientated such that a near side in the X-axis direction is the left side and a back side in the X-axis direction is the right side. The absolute encoder 2 illustrated in FIGS. 1 and 2 is orientated such that the near side in the Y-axis direction is the front side and the back side in the Y-axis direction is the rear side. The absolute encoder 2 illustrated in FIGS. 1 and 2 is orientated such that the upper side in the Z-axis direction is the upper side and the lower side in the Z-axis direction is the lower side. A state when viewed from the upper side in the Z-axis direction is referred to as a plan view, a state when viewed from the front side in the Y-axis direction is referred to as a front view, and a state when viewed from the left side in the X-axis direction is referred to as a side view. The notation for such directions is not intended to limit the use orientation of the absolute encoder 2, and the absolute encoder 2 may be used in any orientation.

The absolute encoder 2 is, for example, an absolute-type rotary encoder specifying and outputting a rotation angle of a main shaft 1a of a motor 1 over multiple rotations. In the present embodiment, the absolute encoder 2 is provided at an upper end portion of the motor 1 in the Z-axis direction. In the present embodiment, the absolute encoder 2 has a substantially rectangular shape in plan view, and has a rectangular shape being thin and long in the up-down direction being the extension direction of the main shaft 1a in front view and side view. That is, the absolute encoder 2 has a flat rectangular parallelepiped shape being longer in the horizontal direction than in the up-down direction.

The absolute encoder 2 includes the case 4 having a hollow and angular tubular shape and accommodating an internal structure. The case 4 includes a plurality of (for example, four) outer wall parts 4a surrounding at least a part of the main shaft 1a of the motor 1, a main shaft gear 10, a first intermediate gear 20, a second intermediate gear 30, a first sub-shaft gear 40, a second sub-shaft gear 50, and the like, and has an open upper end portion.

The shield plate 7 is a member having a rectangular plate shape. The shield plate 7 is fixed at an upper end portion of the outer wall part 4a with a screw to close the case 4. The shield plate 7 is a plate-shaped member provided between angle sensors Sp, Sq, and Sr and the outside of the absolute encoder 2 in an axial direction (Z-axis direction). The shield plate 7 is a magnetic flux shielding member for preventing the angle sensors Sp, Sq, and Sr provided inside the case 4 from being magnetically interfered by a magnetic flux generated outside the absolute encoder 2. The shield plate 7 is made of, for example, a magnetic material.

The motor 1 may be a stepping motor or a DC brushless motor, for example. As an example, the motor 1 may be a motor employed as a drive source for driving an industrial robot via a reduction mechanism such as strain wave gearing. The main shaft 1a of the motor 1 projects from the case of the motor at both sides in the up-down direction. The absolute encoder 2 outputs the rotation angle of the main shaft 1a of the motor 1 as a digital signal.

The motor 1 has a substantially rectangular shape in plan view and also has a substantially rectangular shape in the up-down direction. That is, the motor 1 has a substantially cubic shape. In plan view, the four outer wall parts constituting the outer shape of the motor 1 each have a length of, for example, 25 mm, that is, the outer shape of the motor 1 is a 25 mm square in plan view. Note that the outer shape of the motor 1 is not limited to being 25 mm square in plan view. The outer shape of the motor 1 may be configured to have different sizes depending on the use of the motor 1. The absolute encoder 2 provided at the motor 1 is, for example, in a 25 mm square to match the outer shape of the motor 1. Note that the absolute encoder 2 may have any size matching the outer shape of the motor 1 and not limited to being in 25 mm square.

In FIGS. 1 and 2, the angle sensor support substrate 5 is provided to cover the inside of the absolute encoder 2 together with the case 4 and the shield plate 7.

As illustrated in FIGS. 3 and 5, the angle sensor support substrate 5 has a substantially rectangular shape in plan view and is a plate-shaped printed wiring substrate thin in the up-down direction. As illustrated in FIGS. 2 to 4, a connector 6 is connected to the angle sensor support substrate 5 and is for connecting the absolute encoder 2 and an external device (not illustrated).

As illustrated in FIGS. 2 to 4, the absolute encoder 2 includes the main shaft gear 10 having a first worm gear part 11 (first driving gear). The absolute encoder 2 also includes the first intermediate gear 20 having a first worm wheel part 21 (first driven gear), a second worm gear part 22 (second driving gear), and a third worm gear part 28 (third driving gear). The absolute encoder 2 also includes the second intermediate gear 30 including a third worm wheel part 31 (third driven gear) and a first spur gear part 32 (fourth driving gear). The absolute encoder 2 also includes the first sub-shaft gear 40 having a second worm wheel part 41 (second driven gear) and the second sub-shaft gear 50 having a second spur gear part 51 (third driven gear). The absolute encoder 2 also includes a magnet Mp, the angle sensor Sp corresponding to the magnet Mp, a magnet Mq, the angle sensor Sq corresponding to the magnet Mq, a magnet Mr, the angle sensor Sr corresponding to the magnet Mr, and the microcomputer 121.

As illustrated in FIGS. 4 and 6, the main shaft 1a of the motor 1 is an output shaft of the motor 1 and is an input shaft transmitting a rotational force to the absolute encoder 2. The main shaft gear 10 is fixed at the main shaft 1a of the motor 1 and is rotatably supported by a bearing member of the motor 1 integrally with the main shaft 1a. The first worm gear part 11 is provided at an outer periphery of the main shaft gear 10 to rotate with the rotation of the main shaft 1a of the motor 1. In the main shaft gear 10, the first worm gear part 11 is provided so that a central axis of the first worm gear part 11 coincides or substantially coincides with a central axis of the main shaft 1a. The main shaft gear 10 can be formed of various materials such as a resin material or a metal material. The main shaft gear 10 is formed of, for example, a polyacetal resin.

As illustrated in FIGS. 3 and 4, the first intermediate gear 20 is a gear part transmitting the rotation of the main shaft gear 10 to the first sub-shaft gear 40 and the second intermediate gear 30. The first intermediate gear 20 is axially supported by a shaft 23 around a rotation axial line extending substantially parallel to a gear base part 3. The first intermediate gear 20 is a substantially cylindrical member extending in the direction of the rotation axial line. The first intermediate gear 20 includes the first worm wheel part 21, the second worm gear part 22, and the third worm gear part 28. A through hole is formed at the inside of the first intermediate gear, and the shaft 23 is inserted into the through hole. The first intermediate gear 20 is axially supported by inserting the shaft 23 into a first intermediate gear shaft support part 27 provided at the gear base part 3. The first worm wheel part 21, the second worm gear part 22, and the third worm gear part 28 are disposed at positions separated from one another in this order. The first intermediate gear 20 can be formed of various materials such as a resin material or a metal material. The first intermediate gear 20 is formed of a polyacetal resin.

As illustrated in FIGS. 4 and 7, the first worm wheel part 21 is provided at an outer periphery of the first intermediate gear 20. The first worm wheel part 21 is provided to mesh with the first worm gear part 11 and rotate according to the rotation of the first worm gear part 11. The axial angle between the first worm wheel part 21 and the first worm gear part 11 is set to 90° or approximately 90°.

Although there is no special restriction on an outer diameter of the first worm wheel part 21, in the illustrated example, the outer diameter of the first worm wheel part 21 is configured to be smaller than an outer diameter of the first worm gear part 11. This reduces the dimension in the up-down direction of the absolute encoder 2.

The second worm gear part 22 is provided at the outer periphery of the first intermediate gear 20 together with the first worm wheel part 21, and rotates with the rotation of the first worm wheel part 21. In the first intermediate gear 20, the second worm gear part 22 is provided so that a central axis of the second worm gear part 22 coincides or substantially coincides with a central axis of the first worm wheel part 21.

As illustrated in FIGS. 4 and 8, the third worm gear part 28 is provided at the outer periphery of the first intermediate gear 20 and rotates with the rotation of the first worm wheel part 21. In the first intermediate gear 20, the third worm gear part 28 is provided so that a central axis of the third worm gear part 28 coincides or substantially coincides with the central axis of the first worm wheel part 21.

As illustrated in FIG. 4, the first sub-shaft gear 40 is decelerated according to the rotation of the main shaft 1a and rotates integrally with the magnet Mq. The first sub-shaft gear 40 is a member having a substantially circular shape in plan view, is axially supported by a shaft protruding substantially vertically from the gear base part 3, and includes the second worm wheel part 41 and a holding part holding the magnet Mq. The first sub-shaft gear 40 can be formed of various materials such as a resin material or a metal material. The first sub-shaft gear 40 is formed of a polyacetal resin.

The second worm wheel part 41 is provided at an outer periphery of the first sub-shaft gear 40 and is provided to mesh with the second worm gear part 22 and rotate according to the rotation of the second worm gear part 22. An axial angle between the second worm wheel part 41 and the second worm gear part 22 is set to 90° or approximately 90°. A rotation axial line of the second worm wheel part 41 is provided parallel to or substantially parallel to a rotation axial line of the first worm gear part 11.

In FIGS. 4 and 8, the second intermediate gear 30 is a disk-shaped gear part rotating according to the rotation of the main shaft 1a, decelerating the rotation of the main shaft 1a, and transmitting the decelerated rotation to the second sub-shaft gear 50. The second intermediate gear 30 is provided between the third worm gear part 28 and the second spur gear part 51 provided at the second sub-shaft gear 50. The second spur gear part 51 meshes with the first spur gear part 32. The second intermediate gear 30 includes the third worm wheel part 31 meshing with the third worm gear part 28 of the first intermediate gear 20, and the first spur gear part 32 driving the second spur gear part 51. The second intermediate gear 30 is formed of, for example, a polyacetal resin. The second intermediate gear 30 is a substantially circular member in plan view. The second intermediate gear 30 is axially supported by the gear base part 3.

The providing of the second intermediate gear 30 enables the second sub-shaft gear 50 to be described below to be disposed at a position away from the third worm gear part 28. Therefore, the distance between the magnets Mp and Mq can be increased to reduce an influence of a leakage flux on the magnets Mp and Mq. Furthermore, the providing of the second intermediate gear 30 enables the expansion of the range allowing the reduction ratio to be set, thereby improving the degree of freedom in design.

The third worm wheel part 31 is provided at an outer periphery of the second intermediate gear 30 and is provided to mesh with the third worm gear part 28 and rotate according to the rotation of the third worm gear part 28. The first spur gear part 32 is provided at the outer periphery of the second intermediate gear 30 so that a central axis of the first spur gear part 32 coincides or substantially coincides with a central axis of the third worm wheel part 31. The first spur gear part 32 is provided to mesh with the second spur gear part 51 and rotate according to the rotation of the third worm wheel part 31. A rotation axial line of the third worm wheel part 31 and the first spur gear part 32 is provided parallel or substantially parallel to the rotation axial line of the first worm gear part 11.

In FIG. 8, the second sub-shaft gear 50 is a gear part having a circular shape in plan view, rotating according to the rotation of the main shaft 1a, decelerating the rotation of the main shaft 1a, and transmitting the decelerated rotation to the magnet Mr. The second sub-shaft gear 50 is axially supported around a rotation axial line extending substantially vertically from the gear base part 3. The second sub-shaft gear 50 includes the second spur gear part 51 and a magnet holding part holding the magnet Mr.

The second spur gear part 51 is provided at an outer periphery of the second sub-shaft gear 50 so that a central axis of the second spur gear part 51 coincides or substantially coincides with the central axis of the first spur gear part 32. The second spur gear part 51 is provided to mesh with the first spur gear part 32 and rotate according to the rotation of the third worm wheel part 31. A rotation axial line of the second spur gear part 51 is provided parallel or substantially parallel to the rotation axial line of the first spur gear part 32. The second sub-shaft gear 50 can be formed of various materials such as a resin material or a metal material. The second sub-shaft gear 50 is formed of a polyacetal resin.

Hereinafter, a direction of the first worm wheel part 21 opposing the first worm gear part 11 to mesh with the first worm gear part 11 is referred to as a first meshing direction P1 (direction of arrow P1 in FIG. 4). Similarly, a direction of the second worm gear part 22 opposing the second worm wheel part 41 to mesh with the second worm wheel part 41 is referred to as a second meshing direction P2 (direction of arrow P2 in FIG. 4). Moreover, a direction of the third worm gear part 28 opposing the third worm wheel part 31 to mesh with the third worm wheel part 31 is referred to as a third meshing direction P3 (direction of arrow P3 in FIG. 4). In the present embodiment, the first meshing direction P1, the second meshing direction P2, and the third meshing direction P3 are all directions along a horizontal plane (XY plane).

The magnet Mp is fixed at an upper surface of the main shaft gear 10 so that the central axes of the magnet Mp and the main shaft gear 10 coincide or substantially coincide with each other. The magnet Mp is supported by a magnet support part 17 provided at a central axis of the main shaft gear 10 via a holder part 16. The holder part 16 is made of a non-magnetic material such as an aluminum alloy. An inner peripheral surface of the holder part 16 is formed, for example, in an annular shape corresponding to an outer diameter of the magnet Mp and the shape of an outer peripheral surface of the magnet Mp so as to be in contact with the outer peripheral surface of the magnet Mp in a radial direction and to hold the outer peripheral surface. Furthermore, an inner peripheral surface of the magnet support part 17 is formed, for example, in an annular shape corresponding to an outer diameter of the holder part 16 and the shape of an outer peripheral surface of the holder part 16 so as to be in contact with the outer peripheral surface of the holder part 16. The magnet Mp has 2-pole magnetic poles arranged in a direction perpendicular to a rotation axial line of the main shaft gear 10.

As illustrated in FIGS. 2, 3, and 5, in order to detect a rotation angle of the main shaft gear 10, the angle sensor Sp serving as a sensor unit is provided at a lower surface 5a of the angle sensor support substrate 5 so that a lower surface of the angle sensor Sp opposes an upper surface of the magnet Mp in the up-down direction via a gap. As an example, the angle sensor Sp is fixed at the angle sensor support substrate 5 supported by a substrate post 110 disposed at the gear base part 3 to be described below in the absolute encoder 2. The angle sensor Sp detects the magnetic pole of the magnet Mp, and outputs detected information (hereinafter, referred to as "detection information") to the microcomputer 121. The microcomputer 121 specifies the rotation angle of the main shaft gear 10, that is, a rotation angle of the main shaft 1a, by specifying a rotation angle of the magnet Mp on the basis of the received magnetic pole-related detection information. The resolution of the rotation angle of the main shaft 1a corresponds to the resolution of the angle sensor Sp. As will be described below, the microcomputer 121 specifies the rotation angle of the main shaft 1a on the basis of a specified rotation angle of the first sub-shaft gear 40 and the specified rotation angle of the main shaft 1a, and outputs the specified rotation angle. As an example, the microcomputer 121 may output the rotation angle of the main shaft 1a of the motor 1 as a digital signal.

The angle sensor Sq detects a rotation angle of the second worm wheel part 41, that is, the rotation angle of the first sub-shaft gear 40. The magnet Mq is fixed at an upper surface of the first sub-shaft gear 40 such that the central axes of both the magnet Mq and the first sub-shaft gear 40 coincide or substantially coincide with each other. The magnet Mq has two magnetic poles arranged in a direction perpendicular to a rotation axial line of the first sub-shaft gear 40. As illustrated in FIG. 3, in order to detect the rotation angle of the first sub-shaft gear 40, the angle sensor Sq is provided so that a lower surface of the angle sensor Sq opposes an upper surface of the magnet Mq in the up-down direction via a gap.

As an example, the angle sensor Sq is fixed at the angle sensor support substrate 5 at the same surface as the surface where the angle sensor Sp is fixed, the angle sensor Sp being fixed at the angle sensor support substrate 5. The angle sensor Sq detects the magnetic pole of the magnet Mq, and outputs detection information to the microcomputer 121. The microcomputer 121 specifies a rotation angle of the magnet Mq, that is, the rotation angle of the first sub-shaft gear 40, on the basis of the received magnetic pole-related detection information.

The angle sensor Sr detects a rotation angle of the second spur gear part 51, that is, a rotation angle of the second sub-shaft gear 50. The magnet Mr is fixed at an upper surface of the second sub-axis gear 50 such that the central axes of both the magnet Mr and the second sub-shaft gear 50 coincide or substantially coincide with each other. The magnet Mr has two magnetic poles arranged in a direction perpendicular to a rotation axial line of the second sub-shaft gear 50. As illustrated in FIG. 3, in order to detect the rotation angle of the second sub-shaft gear 50, the angle sensor Sr is provided so that a lower surface of the angle sensor Sr opposes an upper surface of the magnet Mr in the up-down direction via a gap.

As an example, the angle sensor Sr is fixed at the angle sensor support substrate 5 supported by the substrate post 110 disposed at the gear base part 3 to be described below in the absolute encoder 2. The angle sensor Sr detects the magnetic pole of the magnet Mr, and outputs detection information to the microcomputer 121. The microcomputer 121 specifies a rotation angle of the magnet Mr, that is, the rotation angle of the second sub-shaft gear 50, on the basis of the received magnetic pole-related detection information.

A magnetic angle sensor having a relatively high resolution may be used for each angle sensor. For example, the magnetic angle sensor is disposed opposing an end face including magnetic poles of each magnet in an axial direction of each rotating body via a certain gap. The absolute encoder 2 is not limited to the configuration of the magnetic angle sensor used for the angle sensor. For example, the magnetic angle sensor may be disposed opposing the end surface including the magnetic poles of each magnet in an outer circumferential direction of each rotating body via a certain gap. The magnetic angle sensor detects, as a physical quantity, the intensity of a magnetic field varying based on the rotation of the magnetic poles of the magnets, thereby specifying the rotation angle of the opposing rotating body and outputting a digital signal. Examples of the magnetic angle sensor include a detection element detecting a magnetic pole and an arithmetic circuit outputting a digital signal on the basis of the output of the detection element. The detection element may include, for example, a plurality of (for example, four) magnetic field detection elements such as a Hall element or a giant magneto-resistive (GMR) element. Note that each angle sensor may be configured to detect the direction (vector) of a magnetic field as a physical quantity.

The arithmetic circuit may specify, for example, a rotation angle by table processing using a look-up table using, as a key, the difference or ratio of the outputs of the plurality of detection elements. The detection element and the arithmetic circuit may be integrated on one IC chip. This IC chip may be embedded in a resin having a thin rectangular parallelepiped outer shape. Each angle sensor outputs an angle signal to the microcomputer 121 as a digital signal corresponding to the rotation angle of each rotating body detected via a wiring member (not illustrated). For example, each angle sensor outputs the rotation angle of each rotating body as a multi-bit (for example, 7-bit) digital signal.

As illustrated in FIG. 5, the microcomputer 121 is fixed at the angle sensor support substrate 5 by a method such as soldering or bonding. The microcomputer 121 includes a central processing unit (CPU), acquires the digital signal output from each of the angle sensors Sp, Sq, and Sr and representing the rotation angle, and calculates the rotation angle of the main shaft gear 10.

Each block of the microcomputer 121 illustrated in FIG. 9 represents a function implemented by the CPU as the microcomputer 121 executing a program. As illustrated in FIG. 9, the microcomputer 121 includes an angle information generation unit 121$p$, an offset value determination unit 121$q$, a storage unit 121$b$, and a correction unit 121$r$ for performing the method for correcting an angle deviation. That is, the microcomputer 121 serves as an angle deviation correction device performing the method for correcting an angle deviation. Each block of the microcomputer 121 can be implemented by an element or a mechanical device such as a CPU or a random access memory (RAM) of a computer in terms of hardware, and is implemented by a computer program or the like in terms of software. FIG. 9 illustrates functional blocks implemented by cooperation of the hardware and the software. Accordingly, it is understood by those skilled in the art who have read the present specification that these functional blocks can be implemented in various forms by combining hardware and software.

The angle information generation unit 121$p$ generates information (hereinafter, referred to as "angle information") Ap indicating the rotation angle of the main shaft gear 10, that is, the main shaft 1$a$, on the basis of the detection information output from the angle sensor Sp. The angle information generation unit 121$p$ generates angle information Aq of the first sub-shaft gear 40 on the basis of the detection information output from the angle sensor Sq. The angle information generation unit 121$p$ generates angle information Ar as angle information indicating the rotation angle of the second sub-shaft gear 50, on the basis of the detection information detected by the angle sensor Sr. In the present embodiment, the microcomputer 121 uses the angle information Ap generated by the magnet Mp and the angle sensor Sp in order to correct a deviation included in the angle information Ap in a process of determining a value (hereinafter, referred to as "offset value") Ofs for correcting an angle deviation so that a maximum angle deviation is minimized. That is, the present embodiment may be configured not to include the magnets Mq and Mr and the angle sensors Sq and Sr.

The storage unit 121$b$ is a functional unit storing information used in the determination process of the offset value Ofs. The storage unit 121$b$ is configured using a storage device such as a magnetic hard disk device or a semiconductor storage device.

Figure 10:
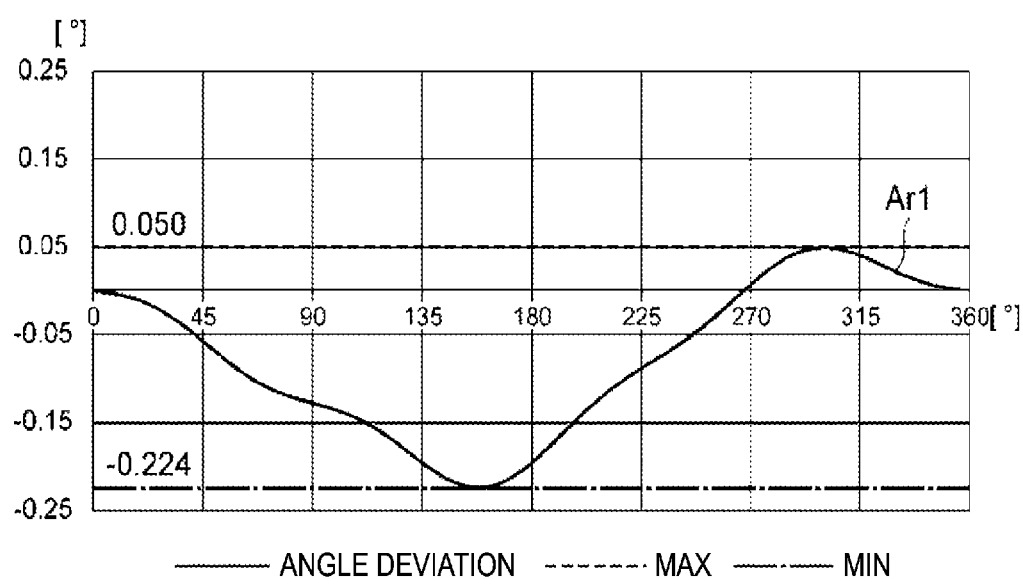
FIG. 10 is a graph showing an example of an angle deviation in one rotation of a main shaft in the absolute encoder 2 illustrated in FIG. 1.

FIG. 10 is a graph showing an example of an angle deviation in one rotation of the main shaft 1$a$ in the absolute encoder 2. In a waveform Ar1 of an angle deviation illustrated in FIG. 10, a horizontal axis denotes the rotation angle of the main shaft 1$a$, and a vertical axis denotes an angle deviation between an actual angle of the main shaft 1$a$ and an angle indicated by an angle generated by rotating the main shaft 1$a$ as an example of a rotating body. In the absolute encoder 2, the angle deviation of the main shaft 1$a$ extends over one rotation (360°) of the main shaft 1$a$.

The storage unit 121$b$ stores information on the angle deviation in the entire angle range of the main shaft 1$a$ measured before shipment. The storage unit 121$b$ further stores Fourier coefficients used in the determination process of the offset value in accordance with the number of cycles (N=1, 2, ..., n).

The offset value determination unit 121q determines an offset value from the angle information Ap of the main shaft 1a at the time of start-up and a predetermined coefficient (for example, a Fourier coefficient) calculated on the basis of the angle deviation recorded in the storage unit 121b.

The correction unit 121r corrects the angle deviation by using the offset value determined by the offset value determination unit 121q.

The absolute encoder 2 outputs the rotation angle of the main shaft 1a of the motor 1 generated by the angle information generation unit 121p to an external control device (hereinafter, referred to as "controller C") controlling the motor 1. The controller C controls the operation of the motor 1 on the basis of the rotation angle output from the absolute encoder 2.

However, the rotation angle specified by the absolute encoder 2 includes a unique angle deviation corresponding to the position (angle) of the main shaft 1a. The unique angle deviation is different for each absolute encoder 2. The unique angle deviation is caused by manufacturing variations of the absolute encoder 2. The manufacturing variation is, for example, a variation included in a manufacturing process such as an assembly of components such as gears and a positional relationship between the magnets Mp, Mq, and Mr and the angle sensors Sp, Sq, and Sr used for detecting the position of a rotating shaft in the absolute encoder 2.

The absolute encoder 2 detects a subsequent position of the main shaft 1a with the start position of the main shaft 1a at the time of start-up as a reference (zero point). In the waveform Ar1 of the angle deviation illustrated in FIG. 10, the reference of the main shaft 1a is 0°. In the waveform Ar1 of the angle deviation illustrated in FIG. 10, a maximum angle deviation in one rotation of the main shaft 1a is 0.224°.

Figure 11:
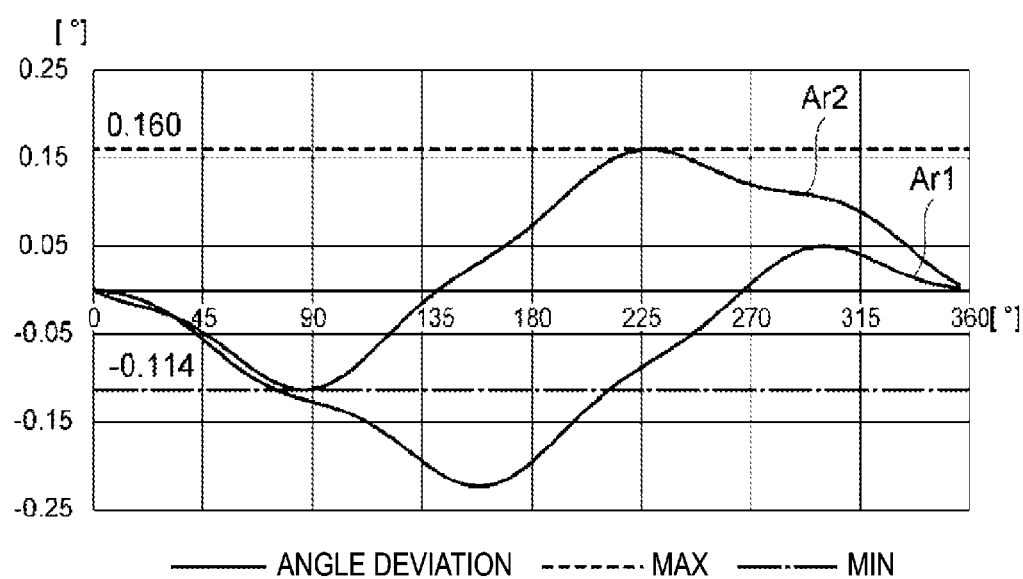
FIG. 11 is a graph showing an example of an angle deviation when a reference of the main shaft is 72° in the absolute encoder 2 illustrated in FIG. 1.

FIG. 11 is a graph showing an example of a waveform Ar2 of an angle deviation when the reference of the main shaft 1a is 72° in the absolute encoder 2. In FIG. 11, a horizontal axis denotes the rotation angle of the main shaft 1a. In FIG. 11, a vertical axis denotes the value of an angle deviation corresponding to the rotation angle of the main shaft 1a. FIG. 11 illustrates the waveform Ar2 of the angle deviation when the reference of the main shaft 1a is 72°, and the waveform Ar1 of the angle deviation when the reference illustrated in FIG. 10 is 0° for comparison. In the waveform Ar2 of the angle deviation, the maximum angle deviation is 0.160°. As illustrated in FIG. 11, in the absolute encoder 2, in comparing the waveform Ar1 of the angle deviation when the reference is 0° with the angle deviation Ar2 when the reference is 72°, a difference of a maximum angle deviation of 0.064° occurs due to a difference in the start position. That is, in the absolute encoder 2, the value of the angle deviation serving as the reference of the main shaft 1a varies depending on the start position of the main shaft 1a. Therefore, in the absolute encoder 2, when the start position of the main shaft 1a is different, the maximum angle deviation is considered to vary.

In a rotary absolute encoder, an angle deviation caused by one rotation of the main shaft 1a has a periodicity of returning to the original state by one rotation of the main shaft 1a. Accordingly, the magnitude (amplitude) of an angle deviation component of the main shaft 1a can be calculated by performing a Fourier transform. Therefore, in the absolute encoder 2, the offset value determination unit 121q implemented by the microcomputer 121 determines an offset value from the angle information Ap of the main shaft 1a at the time of start-up and a predetermined coefficient (for example, a Fourier coefficient) calculated on the basis of the angle deviation so that the maximum angle deviation is minimized. By performing such a process, the absolute encoder 2 can suppress the maximum angle deviation of the angle information Ap regardless of the position of the main shaft 1a at the time of start-up.

Figure 12:
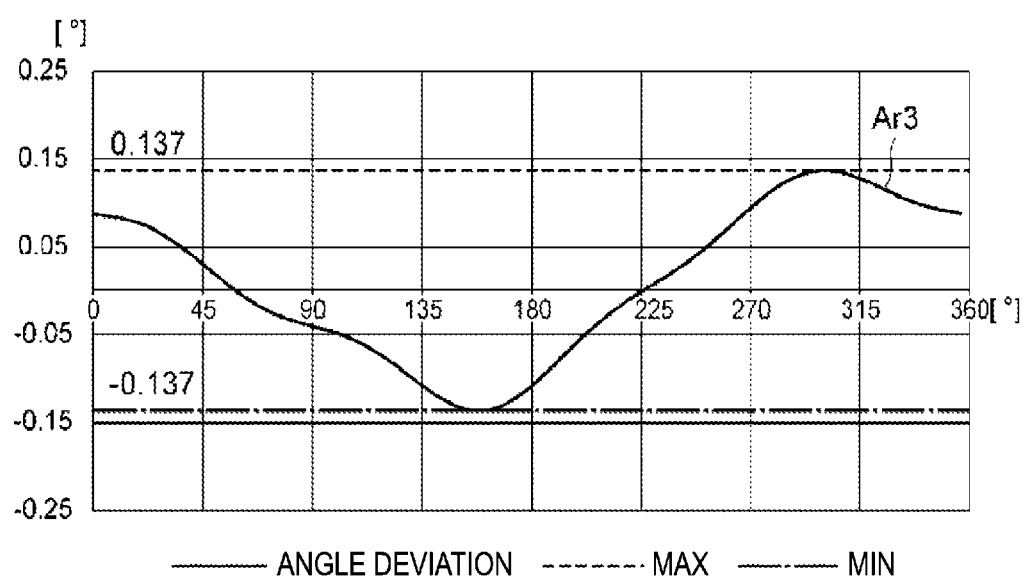
FIG. 12 is a graph showing an example of the waveform of a corrected angle deviation when the reference of the main shaft is 0° in the absolute encoder illustrated in FIG. 1.

FIG. 12 is a graph showing a waveform Ar3 of a corrected angle deviation when the reference of the main shaft 1a is 0°. As illustrated in FIG. 12, the maximum angle deviation of the waveform Ar3 of the corrected angle deviation is 0.137°. The maximum angle deviation of the waveform Ar3 of the corrected angle deviation is suppressed compared to the maximum angle deviation 0.224° of the waveform Ar1 of the angle deviation illustrated in FIG. 10.

Figure 13:
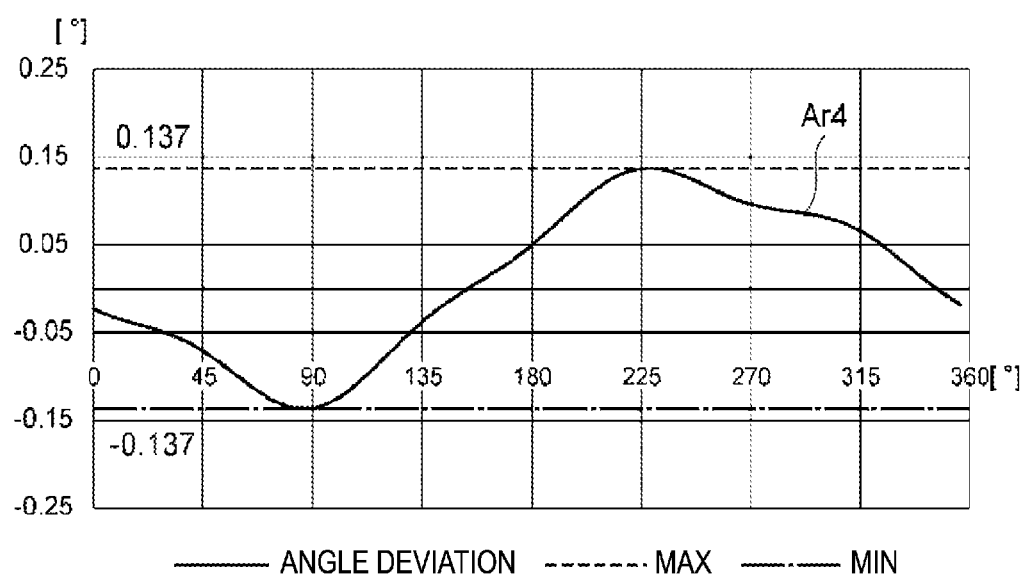
FIG. 13 is a graph showing an example of the waveform of a corrected angle deviation when the reference of the main shaft is 72° in the absolute encoder illustrated in FIG. 1.

FIG. 13 is a graph showing a waveform Ar4 of a corrected angle deviation when the reference of the main shaft 1a is 72°. As illustrated in FIG. 13, the maximum angle deviation of the waveform Ar4 of the corrected angle deviation is 0.137°. The maximum angle deviation of the waveform Ar4 of the corrected angle deviation is suppressed compared to the maximum angle deviation 0.160° of the waveform Ar2 of the angle deviation illustrated in FIG. 11.

A specific example of the determination process of the offset value performed in the absolute encoder 2 is described below.

Figure 14:
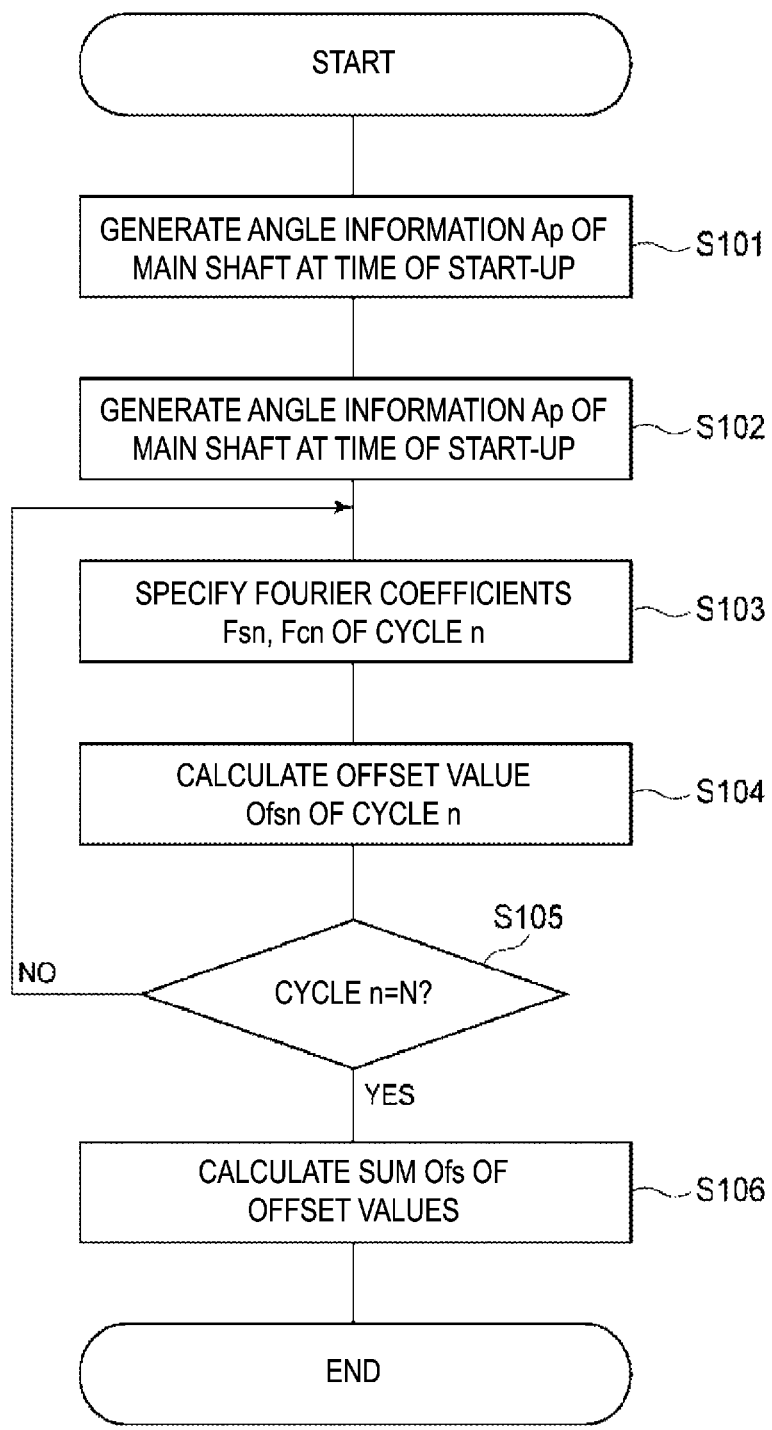
FIG. 14 is a flowchart illustrating an example of a determination process of an offset value for correcting an angle deviation in the absolute encoder illustrated in FIG. 1.

FIG. 14 is a flowchart illustrating an example of the determination process of the offset value for correcting an angle deviation in the absolute encoder 2.

As illustrated in FIG. 14, when the absolute encoder 2 starts to operate, the angle information generation unit 121p generates the angle information Ap of the main shaft 1a on the basis of the detection information output from the angle sensor Sp at the time of start-up (step S101). The offset value determination unit 121q acquires the angle information Ap at the time of start-up generated by the angle information generation unit 121p (step S102).

When the offset value determination unit 121q acquires the angle information Ap of the main shaft 1a at the time of start-up, the offset value determination unit 121q acquires a Fourier coefficient of a predetermined cycle n from the storage unit 121b (step S103). In determining the offset value, the offset value determination unit 121q specifies a Fourier coefficient $Fs_n$ of a sine component and a Fourier coefficient $Fc_n$ of a cosine component of the angle information Ap of the main shaft 1a from the angle information Ap of the main shaft 1a detected at the time of start-up of the absolute encoder 2. For example, from a storage area of the storage unit 121b storing the Fourier coefficient $Fs_n$ and the Fourier coefficient $Fc_n$, the offset value determination unit 121q specifies the Fourier coefficient $Fs_n$ and the Fourier coefficient $Fc_n$ corresponding to the angle information Ap.

The offset value determination unit 121q calculates an offset value of a deviation component of the cycle n (hereinafter, referred to as "offset value $Ofs_n$") from the specified Fourier coefficient $Fs_n$ and Fourier coefficient $Fc_n$ (step S104). The offset value $Ofs_n$ can be calculated by Equation (1) below. Note that values of the Fourier coefficients $Fs_n$ and $Fc_n$ vary depending on the individual absolute encoder 2.

$$Ofs_n = F_{sn} * \sin n\theta + F_{cn} * \cos n\theta \quad (1)$$

The offset value determination unit 121*q* determines whether the calculation of the offset value Ofs$_n$ has reached the number of cycles (for example, n=N) included in the angle deviation (step S105). When the number of cycles of calculating the offset value Ofs$_n$ has not reached N (S105: NO), the offset value determination unit 121*q* returns to step S103 and repeats the calculation of the offset value Ofs$_n$ until the number N of cycles is reached.

When the number of cycles of calculating the offset value Ofs$_n$ has reached N (S105: YES), the offset value determination unit 121*q* calculates the sum of offset values of deviation components in the respective cycles (n=1, 2, . . . , N) calculated using equation (2) below, that is, an offset value Ofs used to correct the angle deviation included in one rotation of the main shaft 1*a* (step S106). After the calculation of the offset value Ofs, the offset value determination unit 121*q* ends the determination process of the offset value.

$$Ofs = \sum_{n=1}^{N} Ofs_n \quad (2)$$

As an example of specific numerical values in the determination process of the offset value Ofs described above, a process when an angle θ of the main shaft 1*a* at the time of start-up in the absolute encoder 2 is 72° and the number N of cycles of the angle deviation of the main shaft 1*a* is 3 is described.

Figure 15:
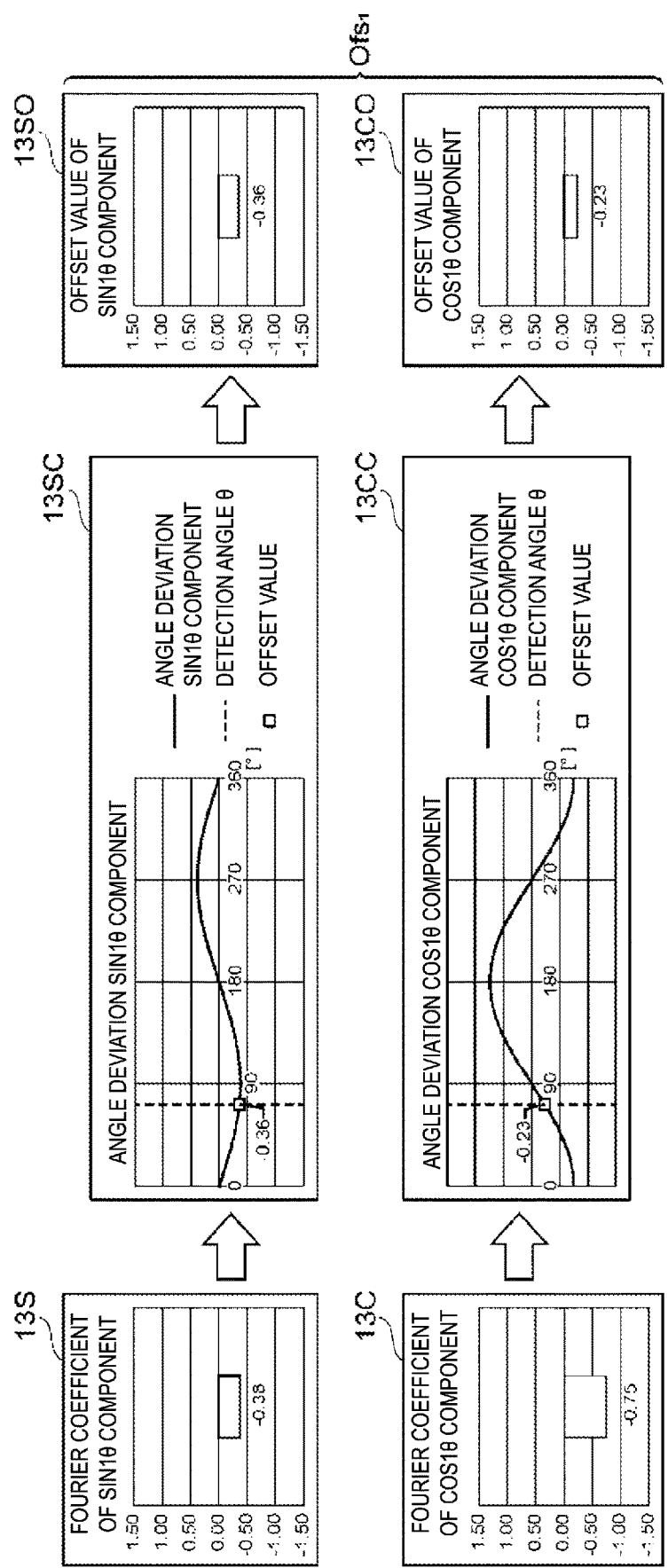
FIG. 15 is a diagram illustrating an example of specific numerical values in a cycle n=1 of the determination process of the offset value.

FIG. 15 is a diagram illustrating an example of specific numerical values in a cycle n=1 of the determination process of the offset value Ofs. In FIG. 15, reference sign 13S indicates a Fourier coefficient of a sin 1θ component indicating a value of Fs$_1$ at θ=72°, reference sign 13SC indicates a sin 1θ angle deviation curve indicating a curve of an angle deviation of the sin 1θ component, and reference sign 13SO indicates an offset value of the sin 1θ component at θ=72°. In FIG. 15, reference sign 13C indicates a Fourier coefficient of a cos 10 component indicating a value of Fc$_1$ at θ=72°, reference sign 13CC indicates a cos 10 angle deviation curve indicating a curve of an angle deviation of the cos 10 component, and reference sign 13CO indicates an offset value of the cos 10 component at θ=72°.

When the angle information Ap at the time of start-up acquired in step S102 is θ=72°, the offset value determination unit 121*q* specifies a Fourier coefficient in the cycle n=1 in step S103. The offset value determination unit 121*q* specifies the Fourier coefficient Fs$_1$ of the sin 1θ component indicated by the reference sign 13S from the angle information Ap of the main shaft 1*a* detected at the time of start-up of the absolute encoder 2. The offset value determination unit 121*q* specifies the Fourier coefficient Fc$_1$ of the cos 10 component indicated by the reference sign 13C from the angle information Ap of the main shaft 1*a*.

According to FIG. 15, Fs$_1$ is −0.38. According to FIG. 15, Fc$_1$ is −0.75.

The offset value determination unit 121*q* specifies the offset value (Ofs$_1$_s1) 13SO of the sin 1θ component from the angle information Ap of the main shaft 1*a* detected at the time of start-up of the absolute encoder 2 and the sin 1θ angle deviation curve 13SC. The offset value determination unit 121*q* specifies the offset value (Ofs$_1$_c1) 13CO of the cos 1θ component from the angle information Ap of the main shaft 1*a* detected at the time of start-up of the absolute encoder 2 and the cos 1θ angle deviation curve 13CC.

An offset value Ofs$_n$_sn of a sinn θ θ component and an offset value Ofs$_n$_cn of a cosn θ component are calculated by the following equations (3) and (4).

$$Ofs_n\_s1 = Fs_n * \sin(n*\theta) \quad (3)$$

$$Ofs_n\_c1 = Fc_n * \cos(n*\theta) \quad (4)$$

When the angle information Ap at the time of start-up of the main shaft 1*a* is 72°, the offset value Ofs$_1$_s1 of the sin 1θ component and the offset value Ofs$_1$_c1 of the cos 1θ component are calculated from the above equations (3) and (4) as follows.

$$Ofs_1\_s1 = -0.38 * \sin(1 * 72°) = -0.36 \ldots$$

$$Ofs_1\_c1 = -0.75 * \cos(1 * 72°) = -0.23 \ldots$$

In step S104, the offset value determination unit 121*q* calculates an offset value Ofs$_1$ from the Fourier coefficient Fs$_1$, the Fourier coefficient Fc$_1$, the offset value Ofs$_1$_s1, the offset value Ofs$_1$_c1, and the angle information Ap of the main shaft 1*a* according to Equation (1) above.

$$Ofs_1 = -0.36 - 0.23 = -0.59$$

Figure 16:
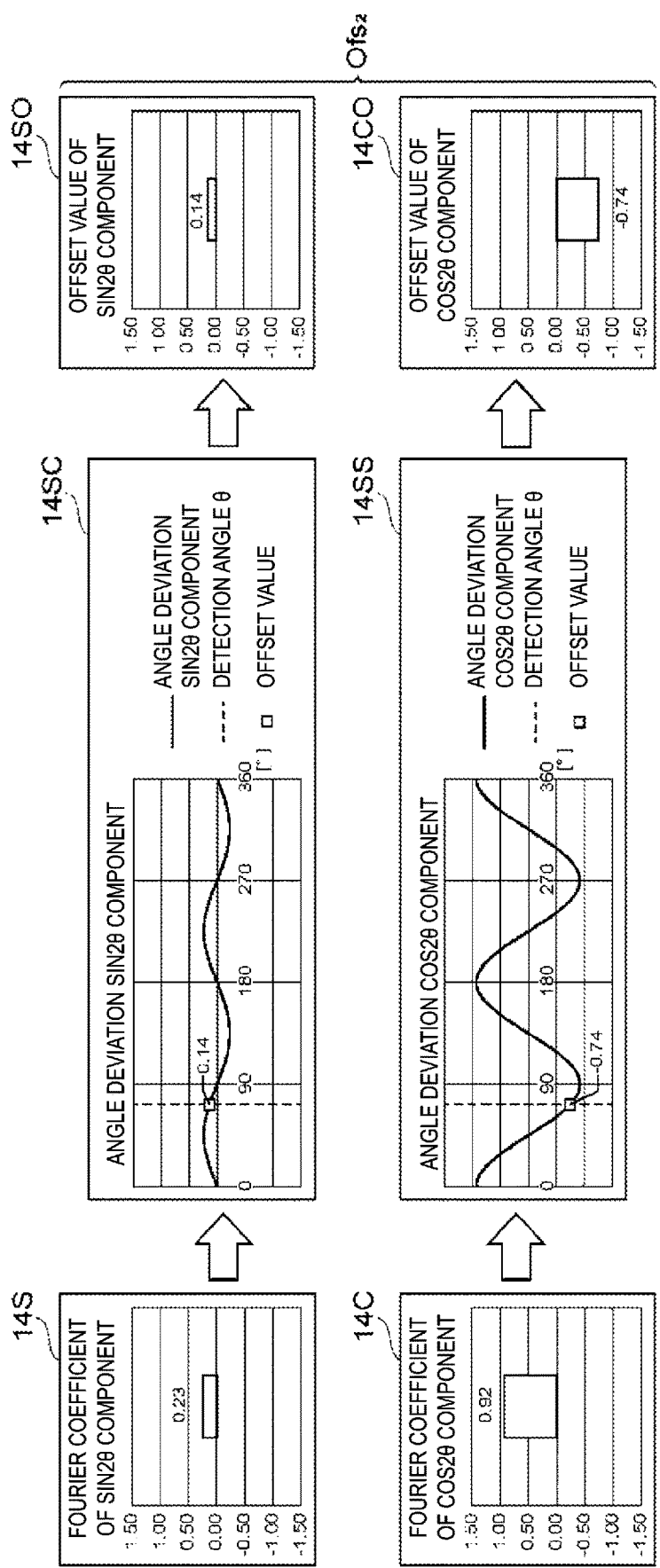
FIG. 16 is a diagram illustrating an example of specific numerical values in a cycle n=2 of the determination process of the offset value.

FIG. 16 is a diagram illustrating an example of specific numerical values in a cycle n=2 of the determination process of the offset value Ofs. In FIG. 16, reference sign 14S indicates a Fourier coefficient Fs$_2$ of a sin 2θ component at θ=72°, reference sign 14SC indicates a sin 2θ angle deviation curve indicating a curve of an angle deviation of the sin 2θ component, and reference sign 14SO indicates an offset value of the sin 2θ component at θ=72°. In FIG. 16, reference sign 14C indicates a Fourier coefficient Fc$_2$ of a cos 2θ component at θ=72°, reference sign 14CC indicates a cos 2θ angle deviation curve indicating a curve of an angle deviation of the cos 2θ component, and reference sign 14CO indicates an offset value of the cos 2θ component at θ=72°.

Similarly to n=1, the offset value determination unit 121*q* calculates an offset value Ofs$_2$ for n=2.

When the angle information Ap at the time of start-up acquired in step S102 is θ=72°, the offset value determination unit 121*q* specifies a Fourier coefficient in the cycle n=2 in step S103. The offset value determination unit 121*q* specifies a Fourier coefficient Fs$_2$ of the sin 2θ component indicated by the reference sign 14S from the angle information Ap of the main shaft 1*a* detected at the time of start-up of the absolute encoder 2. The offset value determination unit 121*q* specifies a Fourier coefficient Fc$_2$ of the cos 2θ component indicated by the reference sign 14C from the angle information Ap of the main shaft 1*a*.

According to FIG. 16, Fs$_2$ is 0.23. According to FIG. 16, Fc$_2$ is 0.92.

The offset value determination unit 121*q* specifies the offset value (Ofs$_2$_s2) 14SO of the sin 2θ component from the angle information Ap of the main shaft 1*a* detected at the time of start-up of the absolute encoder 2 and the sin 2θ angle deviation curve 14SC. The offset value determination unit 121*q* specifies the offset value (Ofs$_2$_c2) 14CO of the cos 2θ component from the angle information Ap of the main shaft 1*a* detected at the time of start-up of the absolute encoder 2 and the cos 2θ angle deviation curve 14CC.

When the angle information Ap at the time of start-up of the main shaft 1*a* is 72°, the sin 2θ offset value Ofs$_2$_s2 and the offset value $Ofs_2\_c2$ of the cos 2θ component are calculated from the above equations (3) and (4) as follows.

$$Ofs_2\_s2 = 0.23 * \sin(2 * 72°) = 0.14 \ldots$$

$$Ofs_2\_c2 = 0.92 * \cos(2 * 72°) = -0.74 \ldots$$

In step S104, the offset value determination unit 121*q* calculates the offset value $Ofs_2$ from the Fourier coefficient $Fs_2$, the Fourier coefficient $Fc_2$, $Ofs_2\_s2$, and $Ofs_2\_c2$ according to Equation (1) above.

$$Ofs_2 = 0.14 - 0.74 = -0.61$$

Figure 17:
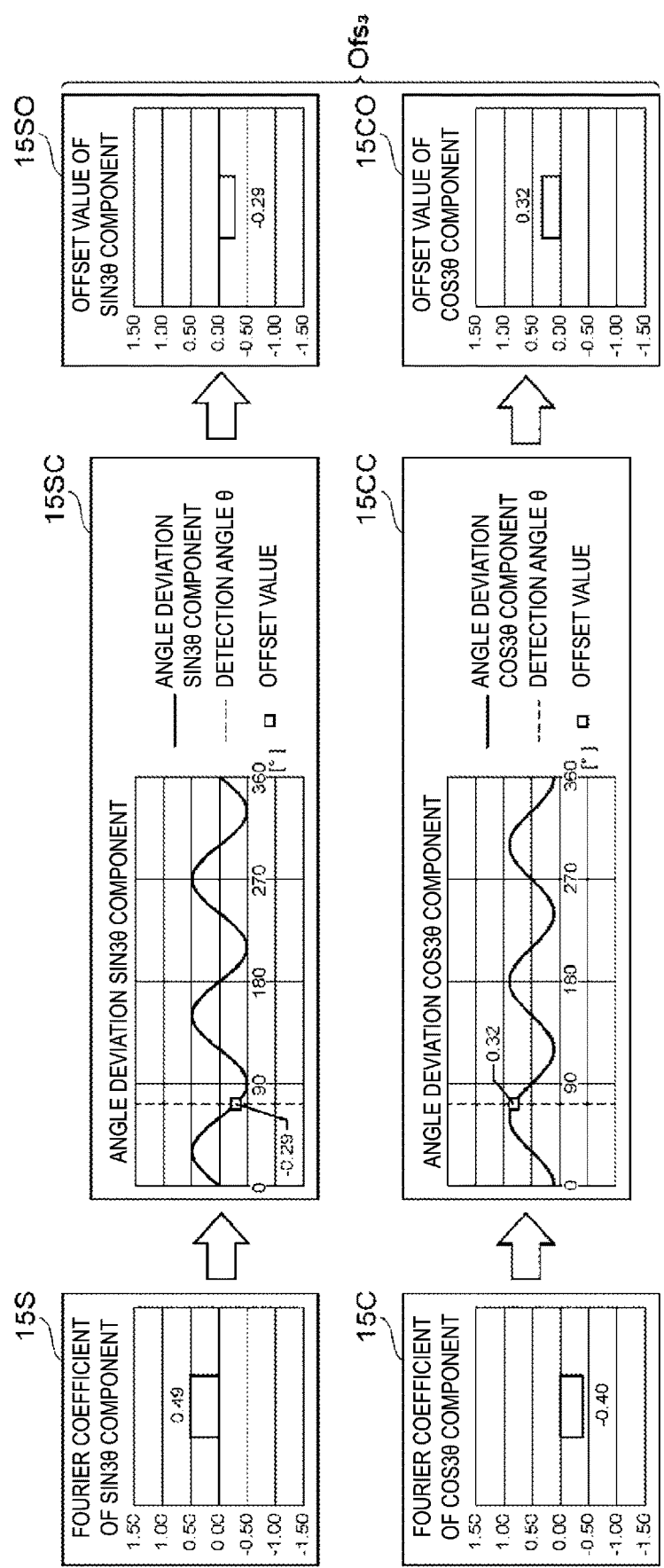
FIG. 17 is a diagram illustrating an example of specific numerical values in a cycle n=3 of the determination process of the offset value.

FIG. 17 is a diagram illustrating an example of specific numerical values in a cycle n=3 of the determination process of the offset value Ofs. In FIG. 17, reference sign 15S indicates a Fourier coefficient $Fs_3$ of a sin 3θ component at θ=72°, reference sign 15SC indicates a sin 3θ angle deviation curve indicating a curve of an angle deviation of the sin 3θ component, and reference sign 15SO indicates an offset value of the sin 3θ component at θ=72°. In FIG. 17, reference sign 15C indicates a Fourier coefficient $Fc_3$ of a cos 3θ component at θ=72°, reference sign 15CC indicates a cos 3θ angle deviation curve indicating a curve of an angle deviation of the cos 3θ component, and reference sign 15CO indicates an offset value of the cos 3θ component at θ=72°.

Similarly to n=1 and 2, the offset value determination unit 121*q* calculates an offset value $Ofs_3$ for n=3.

When the angle information Ap at the time of start-up acquired in step S102 is θ=72°, the offset value determination unit 121*q* specifies a Fourier coefficient in the cycle n=3 in step S103. The offset value determination unit 121*q* specifies a Fourier coefficient $Fs_3$ of the sin 3θ component indicated by the reference sign 15S from the angle information Ap of the main shaft 1*a* detected at the time of start-up of the absolute encoder 2. The offset value determination unit 121*q* specifies a Fourier coefficient $Fc_3$ of the cos 3θ component indicated by the reference sign 15C from the angle information Ap of the main shaft 1*a*.

According to FIG. 17, $Fs_3$ is 0.49. According to FIG. 17, $Fc_3$ is −0.40.

The offset value determination unit 121*q* specifies the offset value ($Ofs_3\_s3$) 15SO of the sin 3θ component from the angle information Ap of the main shaft 1*a* detected at the time of start-up of the absolute encoder 2 and the sin 3θ angle deviation curve 15SC. The offset value determination unit 121*q* specifies the offset value ($Ofs_3\_c3$) 15CO of the cos 3θ component from the angle information Ap of the main shaft 1*a* detected at the time of start-up of the absolute encoder 2 and the cos 3θ angle deviation curve 15CC.

When the angle information Ap at the time of start-up of the main shaft 1*a* is 72°, the offset value $Ofs_3\_s3$ of the sin 3θ component and the offset value $Ofs_3\_c3$ of the cos 3θ component are calculated from the above equations (3) and (4) as follows.

$$Ofs_3\_s3 = 0.49 * \sin(3 * 72°) = -0.29 \ldots$$

$$Ofs_3\_c3 = -0.40 * \cos(3 * 72°) = 0.32 \ldots$$

In step S104, the offset value determination unit 121*q* calculates the offset value $Ofs_3$ from the Fourier coefficient $Fs_3$, the Fourier coefficient $Fc_3$, the offset value $Ofs_3\_s3$, and the offset value $Ofs_3\_c3$ according to equation (1) above.

$$Ofs_3 = 0.29 + 0.32 = 0.04$$

Figure 18A:
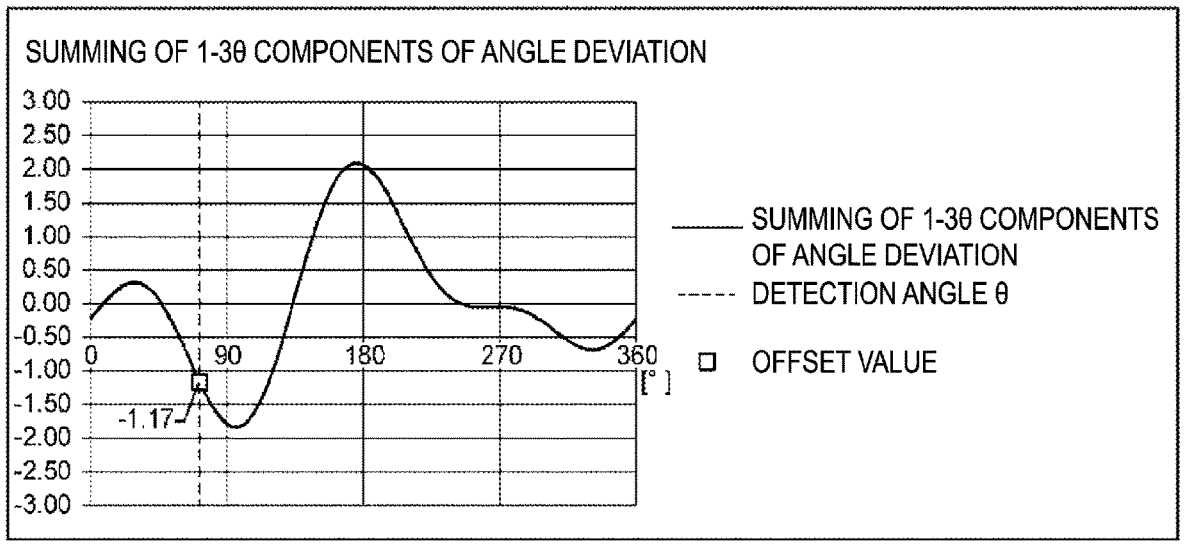
FIG. 18A is a diagram illustrating an example of specific numerical values in the determination process of the offset value, and is a curve of an angle deviation at θ=72°.
Figure 18B:
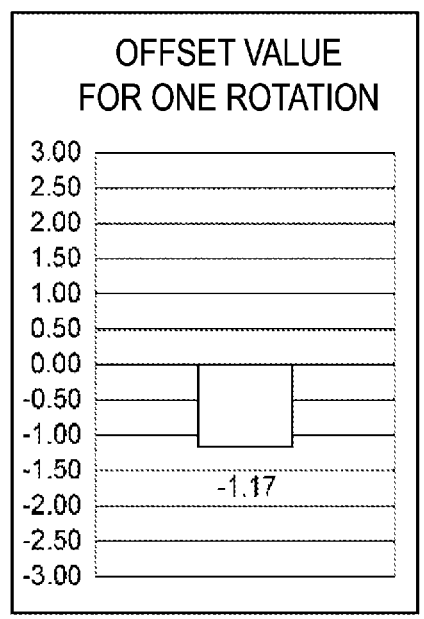
FIG. 18B is a diagram illustrating an example of specific numerical values in the determination process of the offset value, and is a diagram illustrating the value of an offset value at θ=72°.

FIG. 18A and FIG. 18B are diagrams illustrating examples of specific numerical values in the determination process of the offset value Ofs. FIG. 18A is a diagram illustrating a curve of the angle deviation at θ=72°, and FIG. 18B is a diagram illustrating a value of the offset value Ofs at θ=72°.

Since the number N of cycles of calculating the offset value Ofs n reaches 3, the offset value determination unit 121*q* calculates the offset value Ofs used to correct the angle deviation included in one rotation of the main shaft 1*a* by using the above Equation (2) in step S106.

$$Ofs = Ofs_1 + Ofs_2 + Ofs_3 = -0.59 - 0.61 + 0.04 = -1.17$$

The correction unit 121*r* corrects the waveform of the angle deviation by using the offset value Ofs determined by the offset value determination unit 121*q*.

According to the method for correcting an angle deviation in the absolute encoder 2 configured as described above, an offset value for correcting an angle deviation corresponding to the start position of the main shaft 1*a* of the absolute encoder 2 can be determined. Therefore, the microcomputer 121 or the controller C can suppress a maximum value of the angle deviation on the basis of an angle deviation waveform and the offset value. More specifically, the microcomputer 121 or the controller C can suppress a maximum value of the angle deviation waveform by adding or subtracting the offset value to or from each value of the angle deviation waveform. Such an absolute encoder 2 can suppress a maximum value of an angle deviation regardless of the position of a rotating body at the time of start-up.

According to the absolute encoder 2, as coefficients (Fourier coefficients $Fs_n$ and $Fc_n$) necessary for determining the offset value Ofs, two coefficients may be stored for each number of cycles N included in the angle deviation. For example, when N is 3, the number of coefficients is six. Therefore, according to the absolute encoder 2, a maximum value of an angle deviation can be suppressed regardless of the position of a rotating body at the time of start-up while suppressing the storage capacity of the storage unit 121*b*.

Furthermore, according to the absolute encoder 2, as shown in Equations (1) and (2) above, since the offset value Ofs can be calculated by a simple linear equation without classification or approximation with respect to the detection angle, a maximum value of an angle deviation can be suppressed with stable accuracy.

According to the absolute encoder 2 including the microcomputer 121 provided with the offset value determination unit 121*q*, a maximum value of an angle deviation can be suppressed regardless of the position of a rotating body at the time of start-up.

Second Embodiment

An absolute encoder, an angle deviation correction device in the absolute encoder, and a method for correcting an angle deviation in the absolute encoder according to a second embodiment of the present invention are described below. Hereinafter, components having the same or similar functions as the functions of the absolute encoder 2 according to the first embodiment described above are denoted by the same reference signs, and descriptions thereof are omitted and only different components are described.

In step S104 of the method for correcting an angle deviation according to the first embodiment, the offset value determination unit 121q calculates the offset value $Ofs_n$ from the Fourier coefficients $Fs_n$ and $Fc_n$ corresponding to the angle information Ap at the time of start-up and the values of sinn θ and cosn θ of the angle information Ap according to equation (1) above.

In step S104 of the method for correcting an angle deviation according to the second embodiment, the offset value determination unit 121q calculates the offset value $Ofs_n$ by performing an inverse Fourier transform on the Fourier coefficients $Fs_n$ and $Fc_n$ corresponding to the angle information Ap at the time of start-up.

Similarly to the first embodiment, also in the second embodiment, the offset value determination unit 121q repeats the calculation of the offset value $Ofs_n$ indicated from step S103 to step S105 until the number N of cycles is reached. When the number of cycles of calculating the offset value $Ofs_n$ reaches N (S105: YES), the offset value determination unit 121q calculates the offset value Ofs being the sum of the offset values of the respective cycles calculated using the above equation (2) as illustrated in step S106, and ends the offset value determination process.

In accordance with the absolute encoder 2 according to the second embodiment described above, a maximum value of an angle deviation can be suppressed regardless of the position of a rotating body at the time of start-up, similarly to the absolute encoder 2 according to the first embodiment described above.

In addition, a person skilled in the art can appropriately modify the absolute encoder 2 of the present invention according to known knowledge in the related art. Such modifications are of course included in the scope of the present invention as long as these modifications still include the configuration of the present invention.

For example, in the first embodiment and the second embodiment described above, the Fourier coefficients $Fs_n$ and $Fc_n$ of the sin and cos components are stored in the storage unit 121b as coefficients; however, the present invention is not limited to this configuration. For example, the storage unit 121b may store, as predetermined coefficients, a Fourier coefficient obtained by summing a sinn θ component and a cosn θ component and a deflection angle.

In the present embodiment described above, the Fourier coefficients $Fs_n$ and $Fc_n$ of the angle information Ap are stored in the storage unit 121b included in the microcomputer 121 of the absolute encoder 2; however, the present invention is not limited to this configuration. The Fourier coefficients $Fs_n$ and $Fc_n$ of the angle information Ap may be stored in an external storage area (not illustrated) such as a storage area of the controller C.

In the present embodiment described above, the determination process of the offset value Ofs of the angle deviation of the main shaft 1a is performed by the offset value determination unit 121q implemented by the microcomputer 121 of the absolute encoder 2; however, the present invention is not limited to this configuration. The determination process of the offset value Ofs may be performed by causing an external computer (not illustrated) such as a microcomputer of the controller C to execute a program for executing an offset value determination method. In this case, the external computer serves as an angle deviation correction device.

For example, when the microcomputer 121 of the absolute encoder 2 has no function of performing an inverse Fourier transform on the angle information Ap and a predetermined coefficient or has no calculation processing capability, a host device such as the controller C desirably stores the Fourier coefficients $Fs_n$ and $Fc_n$ of the angle information Ap and calculates the offset value Ofs. An example of a criterion for determining whether the determination process of the offset value is possible in the absolute encoder 2 is, for example, whether a floating-point calculation is possible by the microcomputer 121.

In the present embodiment described above, an offset value is a value for correcting an angle deviation so that a maximum angle deviation is minimized, but may be a value for correcting the angle deviation to be reduced.

REFERENCE SIGNS LIST

1 Motor, 1a Main shaft, 2 Absolute encoder, 3 Gear base part, 4 Case, 4a Outer wall part, 5 Angle sensor support substrate, 5a Lower surface, 6 Connector, 7 Shield plate, 10 Main shaft gear, 11 First worm gear part, 13C Fourier coefficient of cos 1θ component, 13CC Cos 1θ angle deviation curve, 13CO Offset value of cos 1θ component, 13S Fourier coefficient of sin 1θ component, 13SC Sin 1θ angle deviation curve, 13SO Offset value of Sin 1θ component, 14C Fourier coefficient of cos 2θ component, 14CC Cos 2θ angle deviation curve, 14CO Offset value of cos 2θ component, 14S Fourier coefficient of sin 2θ component, 14SC Sin 2θ angle deviation curve, 14SO Offset value of Sin 2θ component, 15C Fourier coefficient of cos 3θ component, 15CC Cos 3θ angle deviation curve, 15CO Offset value of cos 3θ component, 15S Fourier coefficient of sin 3θ component, 15SC Sin 3θ angle deviation curve, 15SO Offset value of Sin 3θ component, 16 Holder part, 17 Magnet support part, 20 First intermediate gear, 21 First worm wheel part, 22 Second worm gear part, 23 Shaft, 27 First intermediate gear shaft support part, 28 Third worm gear part, 30 Second intermediate gear, 31 Third worm wheel part, 32 First spur gear part, 40 First sub-shaft gear, 41 Second worm wheel part, 50 Second sub-shaft gear, 51 Second spur gear part, 110 Substrate post, 121 Microcomputer, 121b Storage unit, 121p Angle information generation unit, 121q Offset value determination unit

The invention claimed is:
1. An absolute encoder comprising:
a sensor configured to generate a signal indicating a value of a predetermined physical quantity varying depending on a rotation of a rotating body; and
a computer configured to generate angle information indicating an angle of the rotating body with reference to a position at a time of start-up on the basis of the signal, wherein
the computer determines an offset value for correcting an angle deviation indicating a difference between an angle indicated by the angle information and an actual angle of the rotating body to reduce a maximum value of the angle deviation, on the basis of the angle information for one rotation from the time of start-up and a predetermined coefficient;
the computer offsets each value of the angle deviation with reference to the position at the time of start-up according to the offset value, the coefficient is calculated on the basis of the angle deviation;

the coefficient is a Fourier coefficient of the angle deviation in one of cycles predetermined; and the offset value is obtained by summing values obtained by calculating the coefficient for each of the cycles and performing an inverse Fourier transform on the coefficient.

2. The absolute encoder according to claim 1, wherein the sensor detects a magnetic field of a magnet provided at the rotating body, and the physical quantity is an amount of a magnetic field varying depending on the rotation of the rotating body.

3. An angle deviation correction device in an absolute encoder, the device comprising:

a computer configured to determine, on the basis of angle information indicating an angle of a rotating body with reference to a position at a time of start-up, specifically angle information for one rotation from the time of start-up, and a predetermined coefficient, an offset value for correcting an angle deviation indicating a difference between an angle indicated by the angle information and an actual angle of the rotating body to reduce a maximum value of the angle deviation, the angle information being generated on the basis of a value of a predetermined physical quantity varying depending on a rotation of the rotating body, wherein the computer offsets each value of the angle deviation with reference to the position at the time of start-up according to the offset value;

the coefficient is calculated on the basis of the angle deviation;

the coefficient is a Fourier coefficient of the angle deviation in one of cycles predetermined; and the offset value is obtained by summing values obtained by calculating the coefficient for each of the cycles and performing an inverse Fourier transform on the coefficient.

4. A method for correcting an angle deviation in an absolute encoder, the method comprising:

determining, by a computer, on the basis of angle information indicating an angle of a rotating body with reference to a position at a time of start-up, specifically angle information for one rotation from the time of start-up, and a predetermined coefficient, an offset value for correcting an angle deviation indicating a difference between an angle indicated by the angle information and an actual angle of the rotating body to reduce a maximum value of the angle deviation, the angle information being generated on the basis of a value of a predetermined physical quantity varying depending on a rotation of the rotating body; and offsetting, by the computer, each value of the angle deviation with reference to the position at the time of start-up according to the offset value, wherein the coefficient is calculated on the basis of the angle deviation;

the coefficient is a Fourier coefficient of the angle deviation in one of cycles predetermined; and the offset value is obtained by summing values obtained by calculating the coefficient for each of the cycles and performing an inverse Fourier transform on the coefficient.

* * * * *